US011755193B2

(12) United States Patent
Shunock et al.

(10) Patent No.: US 11,755,193 B2
(45) Date of Patent: Sep. 12, 2023

(54) METHOD AND SYSTEM FOR RECEIVING FEEDBACK FROM A USER

(71) Applicant: Michael Stewart Shunock, Toronto (CA)

(72) Inventors: Michael Stewart Shunock, Toronto (CA); Linda Arhin, Toronto (CA)

(73) Assignee: Michael Stewart Shunock, Toronto (CA)

( * ) Notice: Subject to any disclaimer, the term of this patent is extended or adjusted under 35 U.S.C. 154(b) by 752 days.

(21) Appl. No.: 15/212,733

(22) Filed: Jul. 18, 2016

(65) Prior Publication Data

US 2017/0024120 A1    Jan. 26, 2017

Related U.S. Application Data

(60) Provisional application No. 62/194,465, filed on Jul. 20, 2015.

(51) Int. Cl.
| | |
|---|---|
| *G06F 3/04883* | (2022.01) |
| *G06F 3/04817* | (2022.01) |
| *G06F 3/04812* | (2022.01) |
| *G06F 3/0482* | (2013.01) |
| *G06Q 30/02* | (2023.01) |

(52) U.S. Cl.
CPC ........ *G06F 3/04883* (2013.01); *G06F 3/0482* (2013.01); *G06F 3/04812* (2013.01); *G06F 3/04817* (2013.01); *G06Q 30/02* (2013.01)

(58) Field of Classification Search
CPC .............. G06F 3/04812; G06F 3/0482; G06F 3/04883; G06F 3/04817; G06Q 30/02
See application file for complete search history.

(56) References Cited

U.S. PATENT DOCUMENTS

| | | | |
|---|---|---|---|
| 2008/0062192 A1* | 3/2008 | Voliter ................ | G06F 3/04845 345/591 |
| 2008/0316183 A1 | 12/2008 | Westerman et al. | |
| 2009/0289902 A1 | 11/2009 | Carlvik et al. | |
| 2010/0180232 A1* | 7/2010 | Honan .................. | G06Q 30/02 715/811 |

(Continued)

OTHER PUBLICATIONS

International Search Report and Written Opinion (ISR and WO) from corresponding PCT/CA2016/050848 dated Oct. 14, 2016.

*Primary Examiner* — Tan H Tran
(74) *Attorney, Agent, or Firm* — Bereskin & Parr LLP/S.E.N.C.R.L., s.r.l.

(57) ABSTRACT

A method, system, and recorded instructions are provided for displaying an item on a touch display screen of the computing device, the touch display screen being operable to detect a user contact with the touch display screen; defining, with respect to the touch display screen, a first direction of the touch display screen and a second direction of the touch display screen such that the user contact with the touch display screen indicates both a first directional value in the first direction, and a second directional value in the second direction; then detecting the user contact with the touch display screen when the touch display screen is displaying of the item; determining the first directional value and the second directional value of the user contact; and, determining a response to the user contact based on the first directional value, the second directional value and the item.

23 Claims, 34 Drawing Sheets

(56) References Cited

U.S. PATENT DOCUMENTS

| | | | |
|---|---|---|---|
| 2012/0229410 A1 | 9/2012 | Ohashi | |
| 2013/0154980 A1* | 6/2013 | Byrnes | G06F 3/0482 |
| | | | 345/173 |
| 2014/0074824 A1 | 3/2014 | Rad et al. | |
| 2015/0106735 A1* | 4/2015 | Wu | G06F 3/04842 |
| | | | 715/745 |
| 2015/0227208 A1* | 8/2015 | Blevins | G06F 3/04883 |
| | | | 715/863 |
| 2015/0253850 A1* | 9/2015 | Behles | G06F 3/0488 |
| | | | 715/702 |
| 2015/0356093 A1* | 12/2015 | Abbas | G06F 17/30058 |
| | | | 707/748 |
| 2016/0117329 A1* | 4/2016 | Busey | G06Q 50/01 |
| | | | 707/726 |
| 2016/0371751 A1* | 12/2016 | Cohen | G06Q 30/0277 |
| 2018/0018396 A1* | 1/2018 | Roundtree | G06Q 30/0207 |
| 2018/0069939 A1* | 3/2018 | Matas | H04L 67/22 |

\* cited by examiner

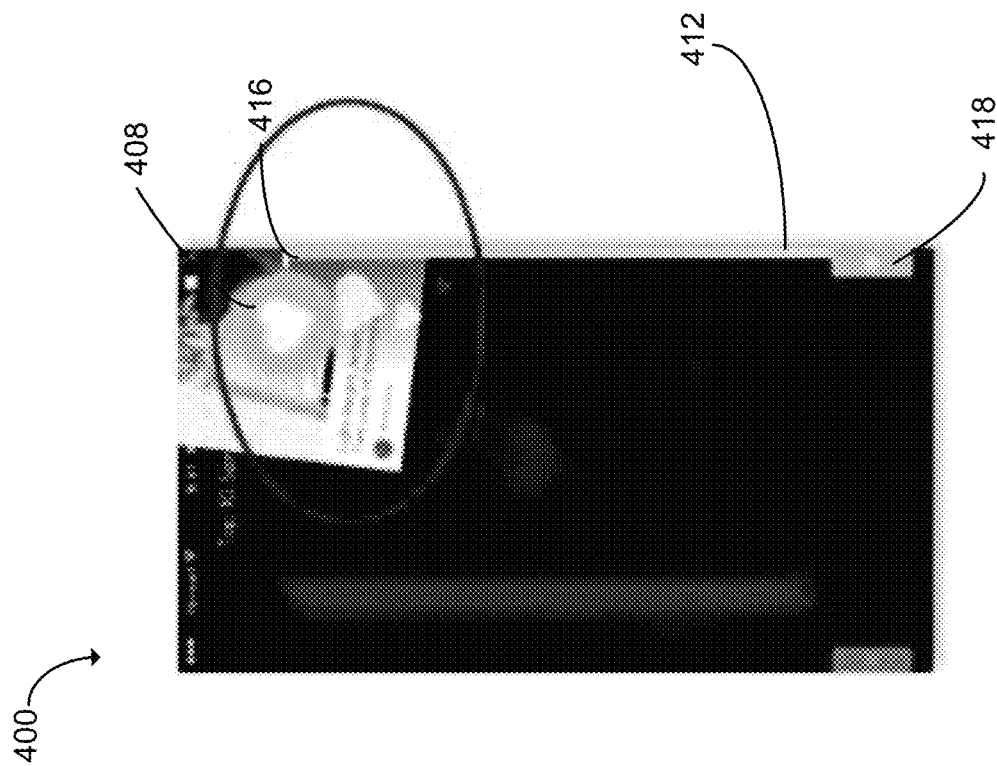

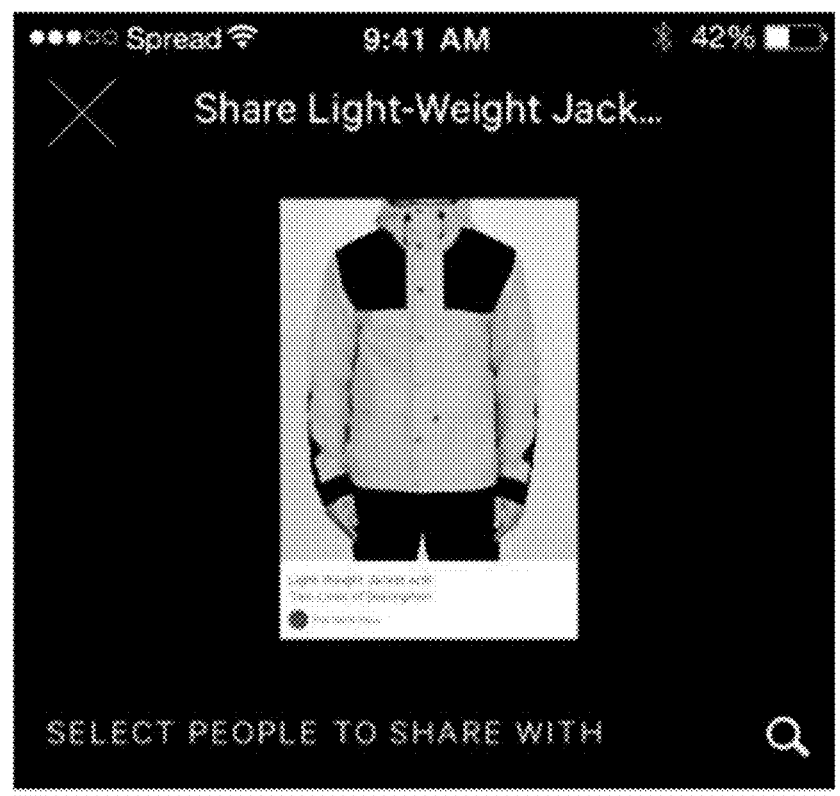
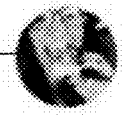 
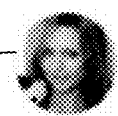 
 
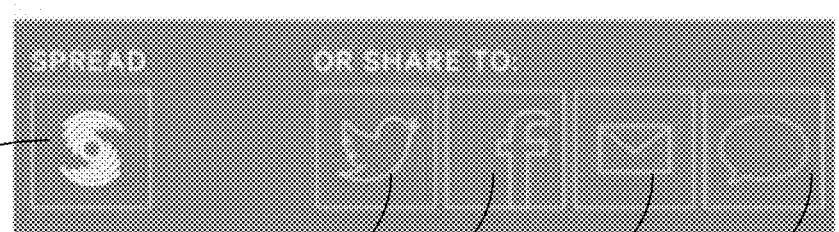
FIG. 10G

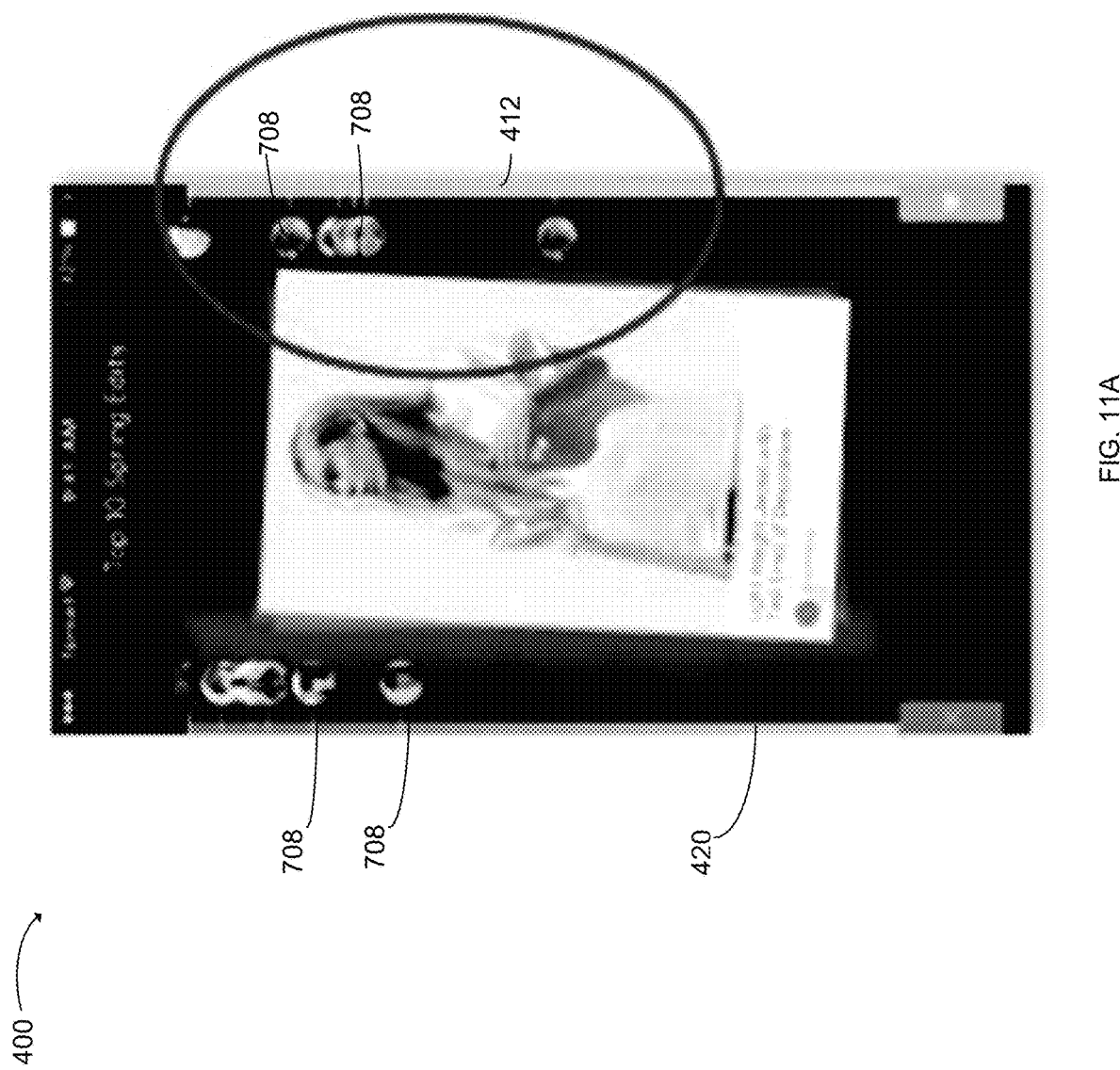

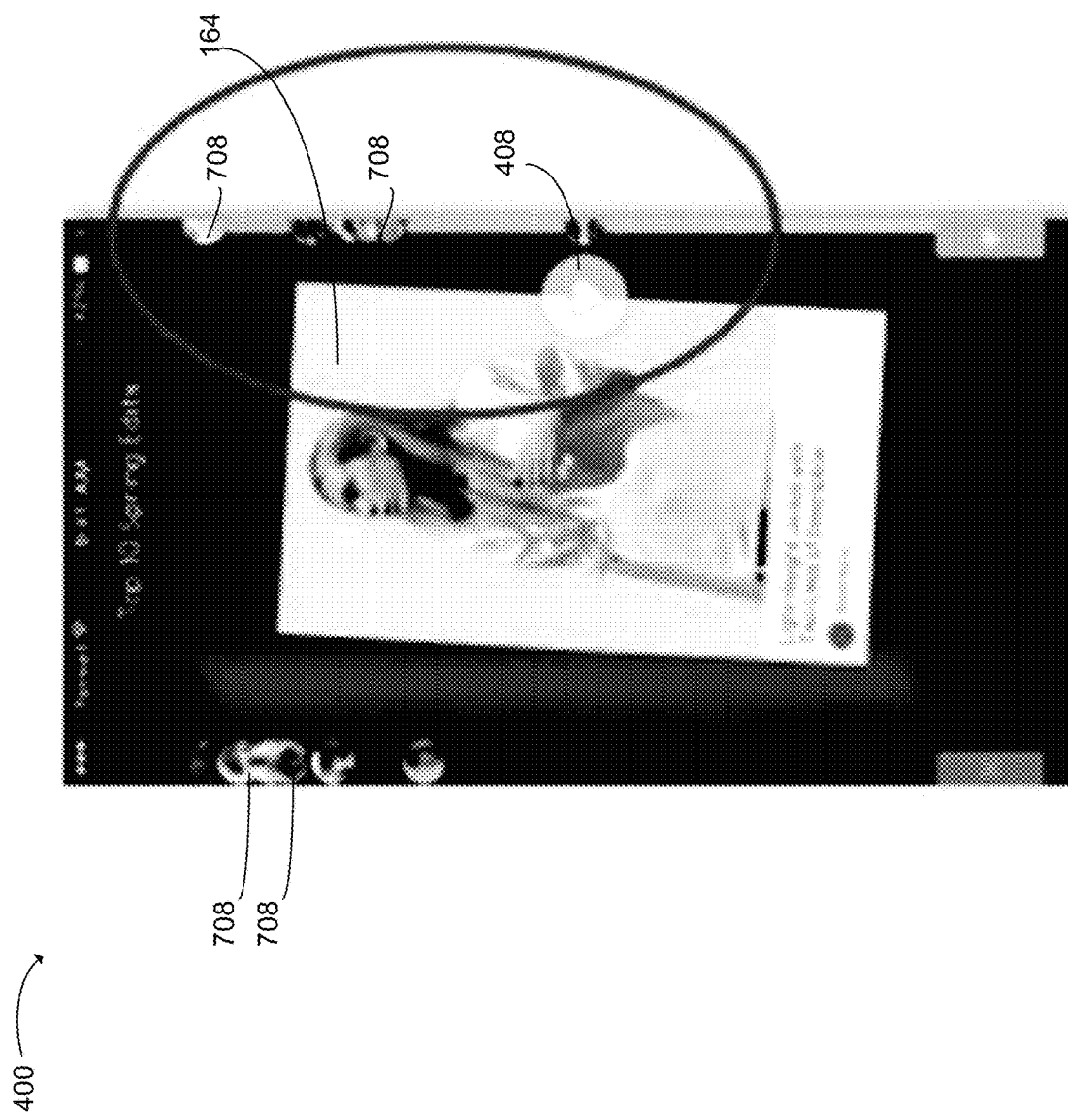

METHOD AND SYSTEM FOR RECEIVING FEEDBACK FROM A USER

RELATED APPLICATIONS

This application claims benefit from the U.S. Patent Application No. 62/194,465 filed Jul. 20, 2015 entitled "METHOD AND SYSTEM FOR RECEIVING FEEDBACK FROM A USER", the disclosure of which is incorporated herein, in its entirety, by reference.

FIELD

The present subject-matter relates to methods and systems for receiving feedback from a user, and more particularly to receiving feedback based on determining a first directional value and a second directional value of a user contact with a touch display screen.

INTRODUCTION

In various contexts, a user will be requested to provide feedback with regard to one or more content items. Where multiple content items are to be evaluated, providing detailed feedback can become a time-consuming and tedious process for the user.

SUMMARY

It would thus be highly desirable to be provided with a system or method that would at least partially address the disadvantages of the existing technologies.

The embodiments described herein provide in one aspect a computer-implemented method of receiving feedback from a user. The method includes displaying an item on a touch display screen, the touch display screen being operable to detect a user contact with the touch display screen; defining, with respect to the touch display screen, a first direction of the touch display screen and a second direction of the touch display screen such that the user contact with the touch display screen indicates both a first directional value in the first direction, and a second directional value in the second direction; then detecting the user contact with the touch display screen when the touch display screen is displaying of the item; determining the first directional value and the second directional value of the user contact; and, determining a response to the user contact based on the first directional value, the second directional value and the item.

The embodiments described herein provide in another aspect a system for receiving feedback from a user. The system includes a memory for storing a plurality of instructions; a processor coupled to the memory, the processor configured for: displaying an item on a touch display screen, the touch display screen being operable to detect a user contact with the touch display screen; defining, with respect to the touch display screen, a first direction of the touch display screen and a second direction of the touch display screen such that the user contact with the touch display screen indicates both a first directional value in the first direction, and a second directional value in the second direction; then detecting the user contact with the touch display screen when the touch display screen is displaying of the item; determining the first directional value and the second directional value of the user contact; and determining a response to the user contact based on the first directional value, the second directional value and the item.

The embodiments described herein provide in yet another aspect a physical, tangible and/or non-transient computer readable medium including computer executable instructions, which, when executed on a computing device using a processor of the computing device, cause the computing device to carry out the following steps: displaying an item on a touch display screen of the computing device, the touch display screen being operable to detect a user contact with the touch display screen; defining, with respect to the touch display screen, a first direction of the touch display screen and a second direction of the touch display screen such that the user contact with the touch display screen indicates both a first directional value in the first direction, and a second directional value in the second direction; then detecting the user contact with the touch display screen when the touch display screen is displaying of the item; determining the first directional value and the second directional value of the user contact; and, determining a response to the user contact based on the first directional value, the second directional value and the item

DRAWINGS

For a better understanding of the embodiments described herein and to show more clearly how they may be carried into effect, reference will now be made, by way of example only, to the accompanying drawings which show at least one exemplary embodiment, and in which:

FIGS. 7A to 7G illustrate captures of an exemplary feedback providing environment 400 during an ongoing feedback providing session;

FIG. 10G illustrates an exemplary user environment for sharing a content item;

FIGS. 11A and 11B illustrate captures of an exemplary feedback providing environment during an ongoing feedback providing session that includes indicators of feedback provided by other users;

DESCRIPTION OF VARIOUS EMBODIMENTS

Figure 1:
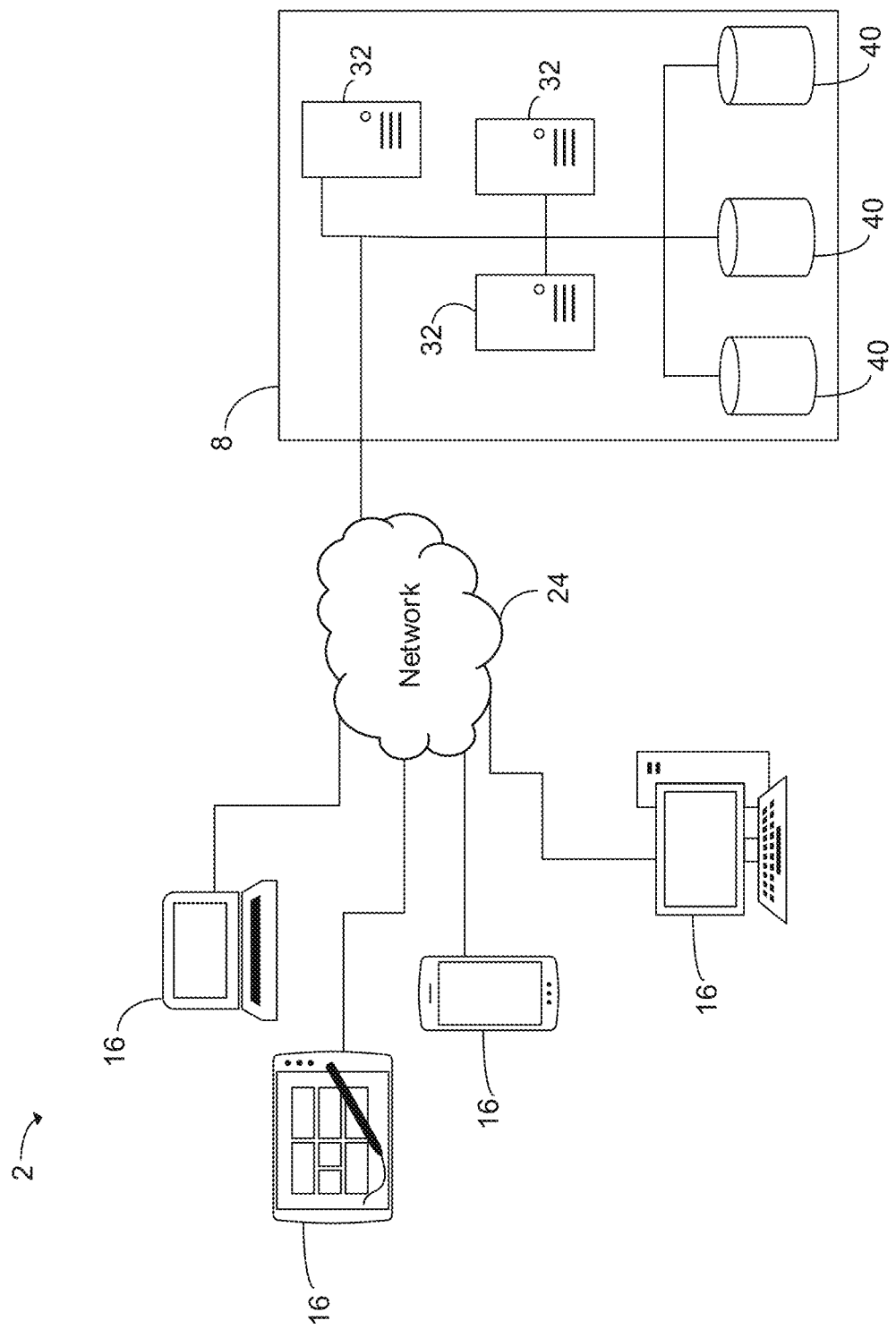
FIG. 1 illustrates a schematic diagram of an interconnection of devices of a feedback receiving system according to one exemplary embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The various embodiments of the systems and methods described herein may be implemented in hardware or software, or a combination of both. For example, some embodiments may be implemented in computer systems and computer programs, which may be stored on a physical computer readable medium, executable on programmable computers (e.g. computing devices and/or processing devices) each comprising at least one processor, a data storage system (including volatile and non-volatile memory and/or storage elements), at least one input device (e.g. a keyboard, mouse or touchscreen), and at least one output device (e.g. a display screen, a network, or a remote server). For example, and without limitation, the programmable computers may include servers, personal computers, laptops, tablets, personal data assistants (PDA), cell phones, smart phones, gaming devices, and other mobile devices. Program code can be applied to input data to perform the functions described herein and to generate output information. The output information can then be supplied to one or more output devices for outputting to one or more users.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer for configuring and operating the computer when the storage media or device is read by the computer to perform the procedures described herein. The system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer-usable instructions for one or more processors. The medium may be provided in various forms including one or more diskettes, compact disks, tapes, chips, wireline transmissions, satellite transmissions, internet transmission or downloadings, magnetic and electronic storage media, digital and analog signals, and the like. The computer-usable instructions may also be in various forms including compiled and non-compiled code.

"Association of data entries" herein refers to a link, such as a logical link, between at least two pieces of electronic information, such as data entries, so that accessing a first of the pieces of electronic information allows for finding and accessing the other pieces of electronic information associated with the first piece of electronic information.

Referring now to FIG. 1, shown therein is an example embodiment of a interconnection 2 of devices that includes an implementation of a feedback receiving system.

One or more user devices 16 can communicate with a networked system 8 via a network 24.

The user devices 16 can be any computing devices generally suitable for facilitating communication with the networked system 8 over the network 24. For example, the user device 16 could be a laptop, personal data assistant, smart phone, desktop computer, tablet, set-top box, or video game console. For example, the user device 16 can run one or more of a variety of operating systems or platforms, such as Windows, Mac OS, OS X, iOS or Android.

Each user device 16 adapted for implementing the feedback receiving system and method includes a touch display screen 18. A touch display screen 18 herein refers to a display device for displaying visual information that includes a touchscreen input device. A user may interact with the touchscreen input device by contacting one or more viewable areas of the display device. The contacting may be from a user's body part, such as fingers, or from a user operated intermediate device, such as a stylus. The touch display screen is operable to detect the user contact with the touch display screen 18. A touch display screen 18 may include, but is not limited to, the display of a smartphone, the display of a tablet, the display of a laptop, the touch-enabled display monitor of a desktop computer, and the display of a video game controller.

Each user device 16 includes one or more processors configured to carry out various computing steps for receiving user feedback, as described herein.

The user devices 16 may be connected to the networked system 8 via any suitable communications channel. For example, the computing may communicate over the network 24 that is a local area network (LAN) or Intranet) or using an external network, such as, by the Internet. Communication may be carried out using a standalone app or a browser operating on the user device. It will be appreciated that communication between the user devices 16 and the networked system 8 may be carried out over a wired network, wireless network, or a combination thereof.

In some cases, one or more human users interacting with the user devices 16 may be required to authenticate their identities in order to communicate with the networked system 8. For example, the user devices 16 may be required to input a login name and/or a password or otherwise identify themselves to gain access to the page-generating system 8.

In other cases, one or more users (e.g. "guest" users) may be able to access the networked system 8 without authentication. Such guest users may be provided with limited access, such as access to a limited set of features of the feedback receiving system.

The networked system 8 generally includes one or more processing devices 32 (ex: servers, workstations), each having one or more processors configured to carry out various computing steps for receiving user feedback, as described herein.

According to various exemplary embodiments, computing steps for receiving and/or sharing user feedback may be shared between the one or more processors of one or more user devices and processors of processing devices 32 of the networked system 8.

The networked system 8 may be implemented as a cloud-based system.

The networked system 8 also generally includes one or more data storage devices 40 (ex: memory, etc.) that are in communication with the processing devices 32, and could include a relational database (such as a SQL database), or other suitable data storage devices. The data storage devices 40 are configured to host data related to the receiving and/or sharing of user feedback, as described elsewhere herein.

The data storage devices 40 are configured to also store user-related information, such as user-defined preferences, user-related information collected from external systems (ex: social-network activities), user profiles, user permissions, and data related to received user feedback.

A plurality of users can be registered to access the user feedback receiving system 42. A user may interact with the user feedback receiving system as a content-creating user or a feedback providing user. When permitted, the user can also view actions and feedback provided by other users.

Figure 2:
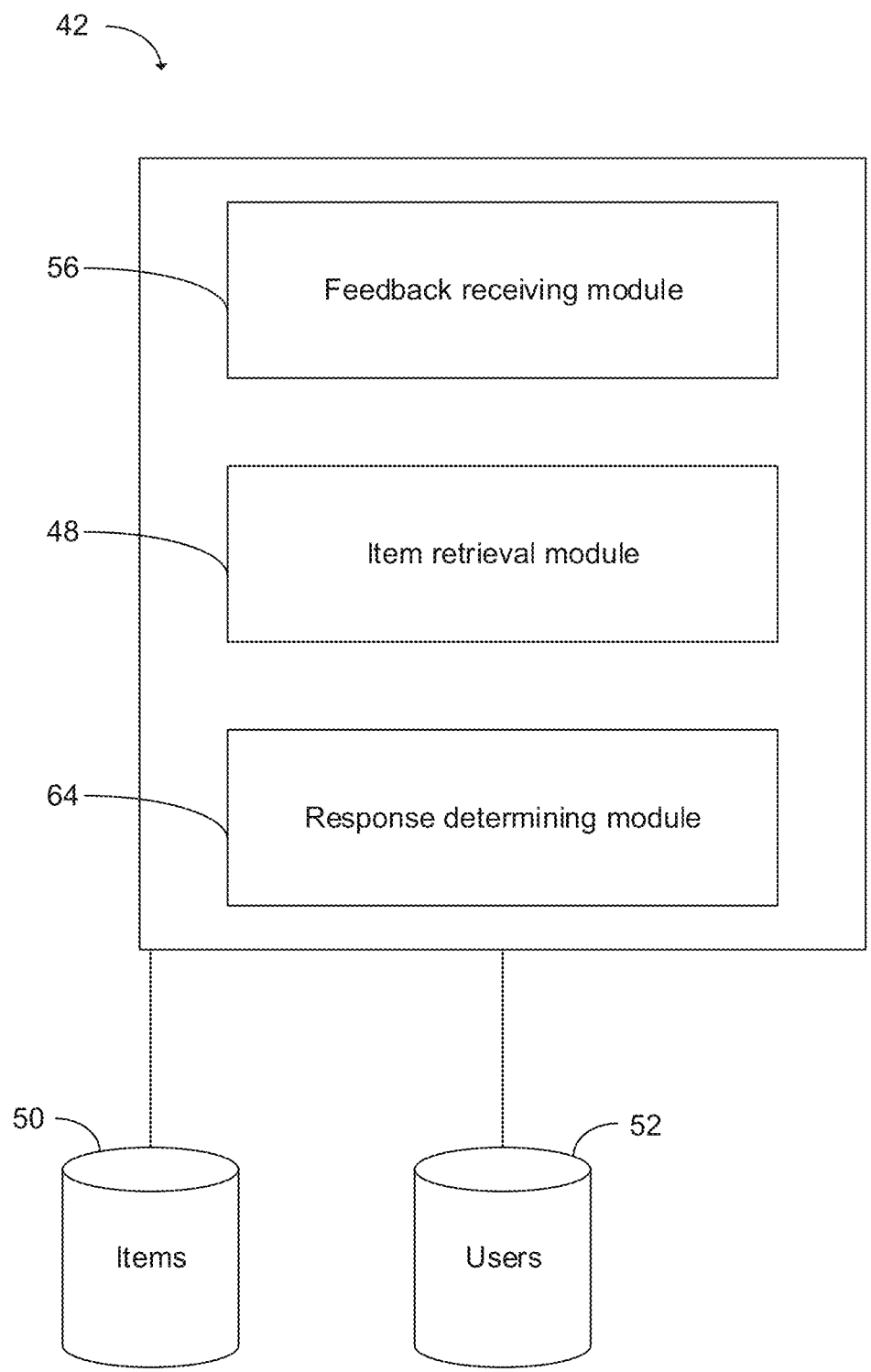
FIG. 2 illustrates a block diagram of modules of a feedback receiving system according to one exemplary embodiment.

Referring now to FIG. 2, therein illustrated is a block diagram of an example embodiment of modules of a user feedback receiving system 42. The plurality of modules may be implemented in hardware or software or combination of both on the one or more the user devices 16 and/or the networked system 8. For example, functionalities of the modules can be carried out by the one or more processors of one or more user devices 16, processors of the networked systems 8 or both.

The user feedback receiving system 42 includes a content items retrieval module 48. The content items retrieval module 48 receives or retrieves at least one electronic content item that is to be reviewed by the user and for which feedback is to be received.

The electronic content item may be any form of electronic content that can be displayed, executed or played back on a user device 16. For example, the at least one electronic content item may be any one or more of multimedia content, images, graphics, text, comments, links, audio, video, maps, social media feed, and interactive web content.

The content items retrieval module 48 can retrieve the at least one electronic content item from a content items database 50 that is in communication with the content items retrieval module 48. For example, electronic content items stored in the content items database 50 may have been uploaded to the content items database 50 by a content-creating user. The creating user can interact with a user device 16 to upload the content items to the content items database so that feedback can be received from other users for these uploaded content items.

The content-creating user may select content items stored locally at the user device 16 and upload these to the content items database 50.

The content-creating user may select content items stored externally and have these linked to or stored within the content items database 50. For example, the externally stored content items may be stored with a cloud-based file storage system, such as Box™, DropBox™, Windows Live™, Google Drive™, Tumblr™, Flickr™ or similar systems. The externally stored content items may be transmitted within an external social media networking service, such as Facebook, Twitter, Instagram, LinkedIn, etc. . . . .

Figure 3:
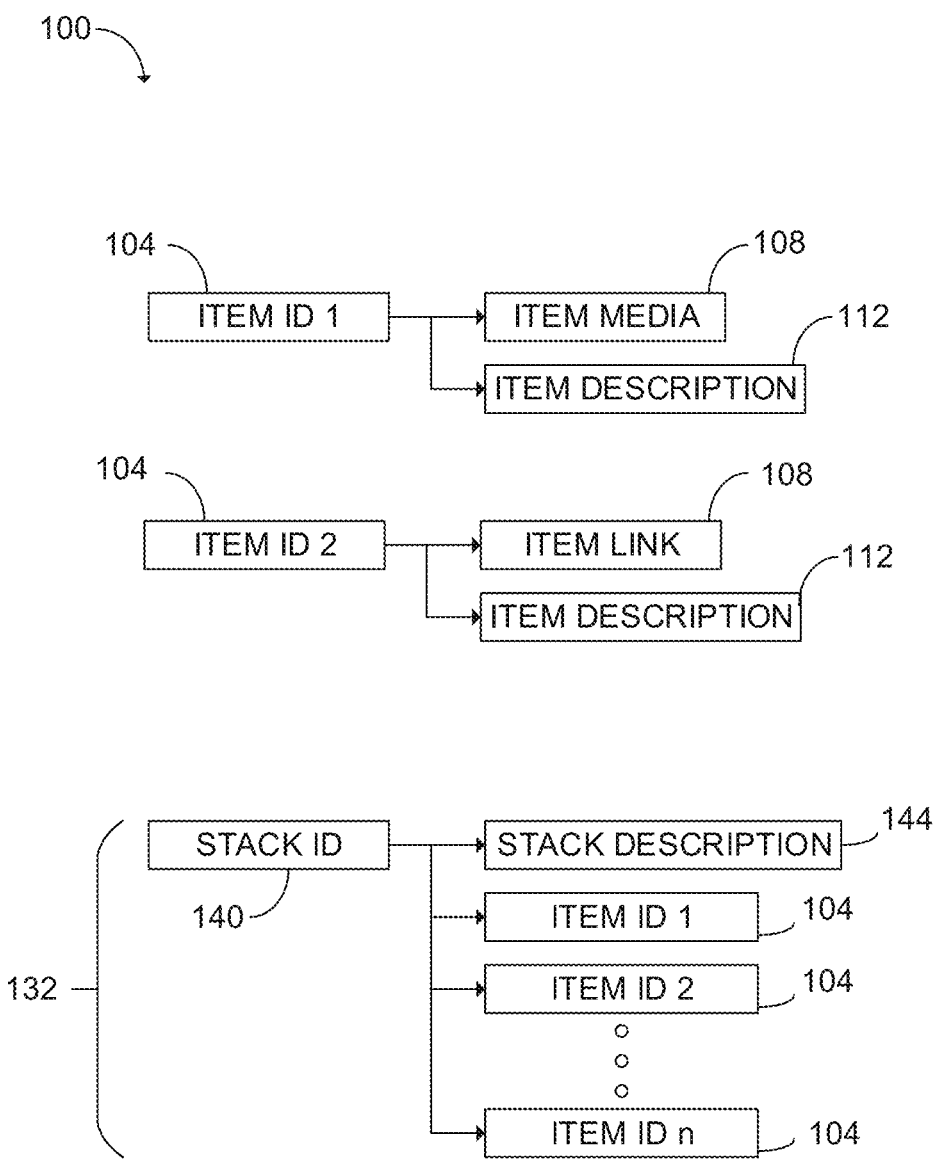
FIG. 3 illustrates a block diagram of an exemplary data structure of stored electronic content items.

Referring now to FIG. 3, therein illustrated is a block diagram of an exemplary data structure 100 of electronic content items stored within a content items database 50. The exemplary data structure 100 includes a first item identifier 104 that is associated with a first media content 108 and an item description entry 112. The first media content 108 can be displayed, executed or played back on a user device 16. The item description entry 112 provides a description and/or properties of the content item.

The exemplary data structure 100 includes a second item identifier 116 that is associated with an item link 120 and an item description entry 124. The item link 120 provides a link to content that is stored externally.

According to various exemplary embodiments, content items may be aggregated within stacks. Stacks refer to a collection of more than one electronic content items that are to be treated together for feedback receiving purposes. As illustrated in FIG. 3, a stack 132 includes a stack identifier 140, which is associated with a stack description entry 144 and a plurality of item identifiers 104. The item identifiers 104 identify the content items that are included within the stack.

A user may interact with the user feedback receiving system 42 as a feedback providing user. A feedback providing session is initiated and the user participates in the feedback providing session via a user device 16 to provide feedback for one or more content items. The item retrieval module 48 makes available to that user one or more electronic content items associated with an identifier entry of the user for feedback receiving purposes. That is, these electronic content items have been linked to an account of the feedback providing user so the user can view these items and provide his or her feedback for the items.

Making the one or more electronic content items available refers to displaying the electronic content items or providing an option for the feedback providing user to select the electronic content items for displaying on the user device 16.

The feedback receiving system 42 may include a user database 52 that is in communication with the content item retrieval module 48. The content items retrieval module 48 can retrieve from the user database 52 the content items associated with the particular feedback providing user.

Associations between the identifier entry of the feedback providing user and a content item may be created outside the feedback providing session. For example, another user can perform an action to share a content item with the feedback providing user, which creates the association between the feedback providing user and the content items. In some examples, the feedback providing user may be a follower of another user, and any content items shared by the other users may automatically create an association between the feedback providing user and the share content items.

For example, an association between the feedback providing user and a content item may be created based on predefined rules. These rules may be preferences defined by the feedback providing user. Any electronic content items newly stored within the electronic content items database having properties that match the preferences may be automatically associated with the feedback providing user.

For example, an association may be manually made by the feedback providing user. The user may browse or search electronic content items stored in the electronic content items database 50 and manually select those one or more content items to be viewed and for which to provide feedback.

Figure 4:
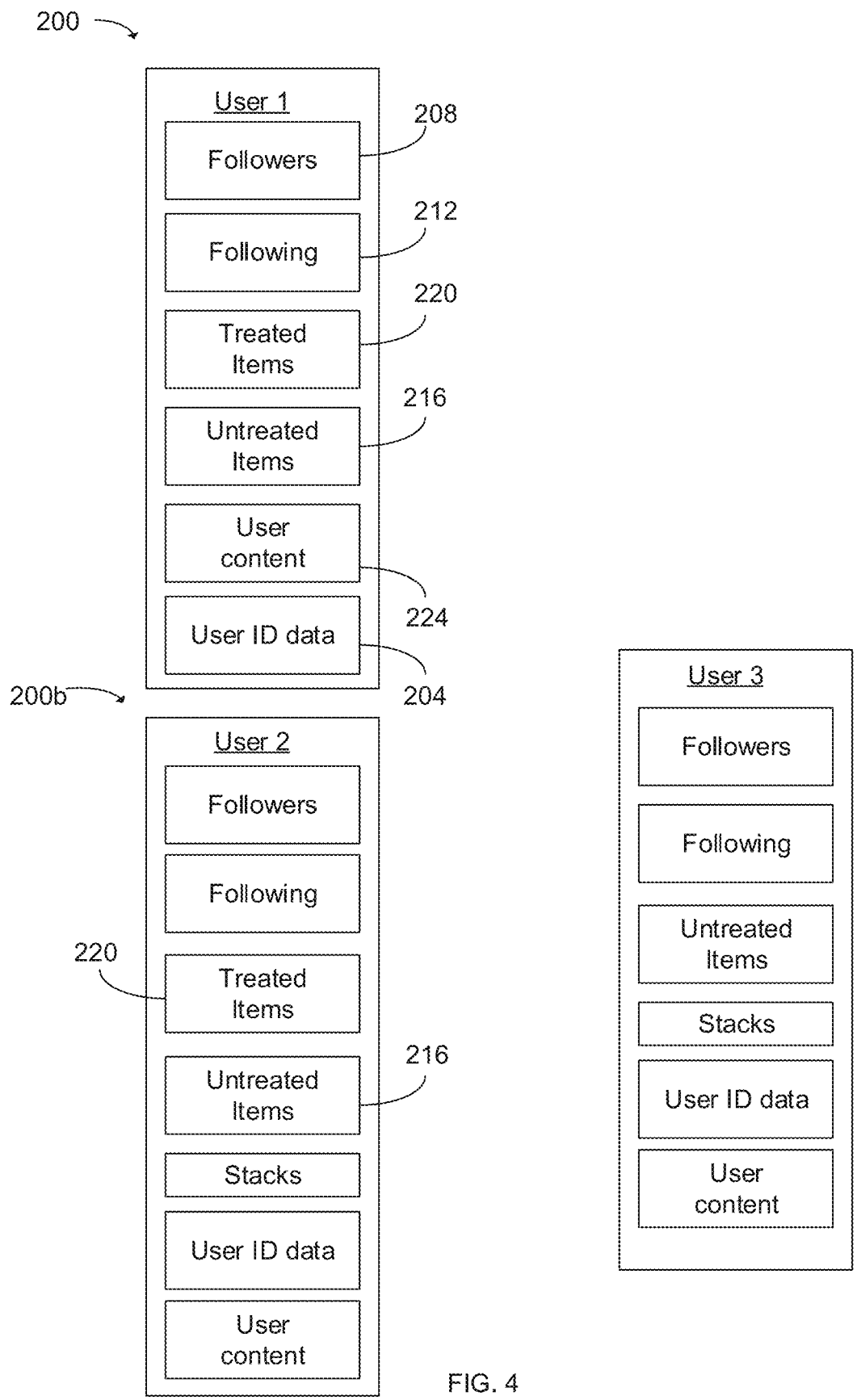
FIG. 4 illustrates a block diagram of an exemplary data structure of a plurality of stored user data entries.

Referring now to FIG. 4, therein illustrated is a block diagram of an exemplary data structure of a plurality of stored user data entries.

A user data entry 200 includes a user data identifier entry 204, which includes information for identifying the user and may further include user properties and user defined preferences.

The user data entry 200 further includes a followers entry 208, which stores identifiers of other users that are associated with the user as followers of the user.

The user data entry 200 further includes a following entry 212, which stores identifiers of other users that are associated with the user as other users being followed by the user.

The user data entry 200 includes an untreated items entry 216, which stores identifiers 104 of content items that have been associated with the user and can be made available to the user. However, these content items have yet to receive feedback from the user.

The user data entry 200 includes a treated items entry 220, which stores identifiers 104 of content items that have been associated with the user and for which the user has provided feedback. Feedback provided by the user may also be stored within the treated items entry.

The user data entry 200 includes a user-created content items entry 224, which stores identifiers of content items or item stacks that have been created by the user.

Within a feedback providing session, the content item retrieval module 48 displays a content item on the touch display screen 18 of user device 16 being used by a user providing device. The item that is displayed is one of the content items made available by the content item retrieval module 48.

Figure 5:
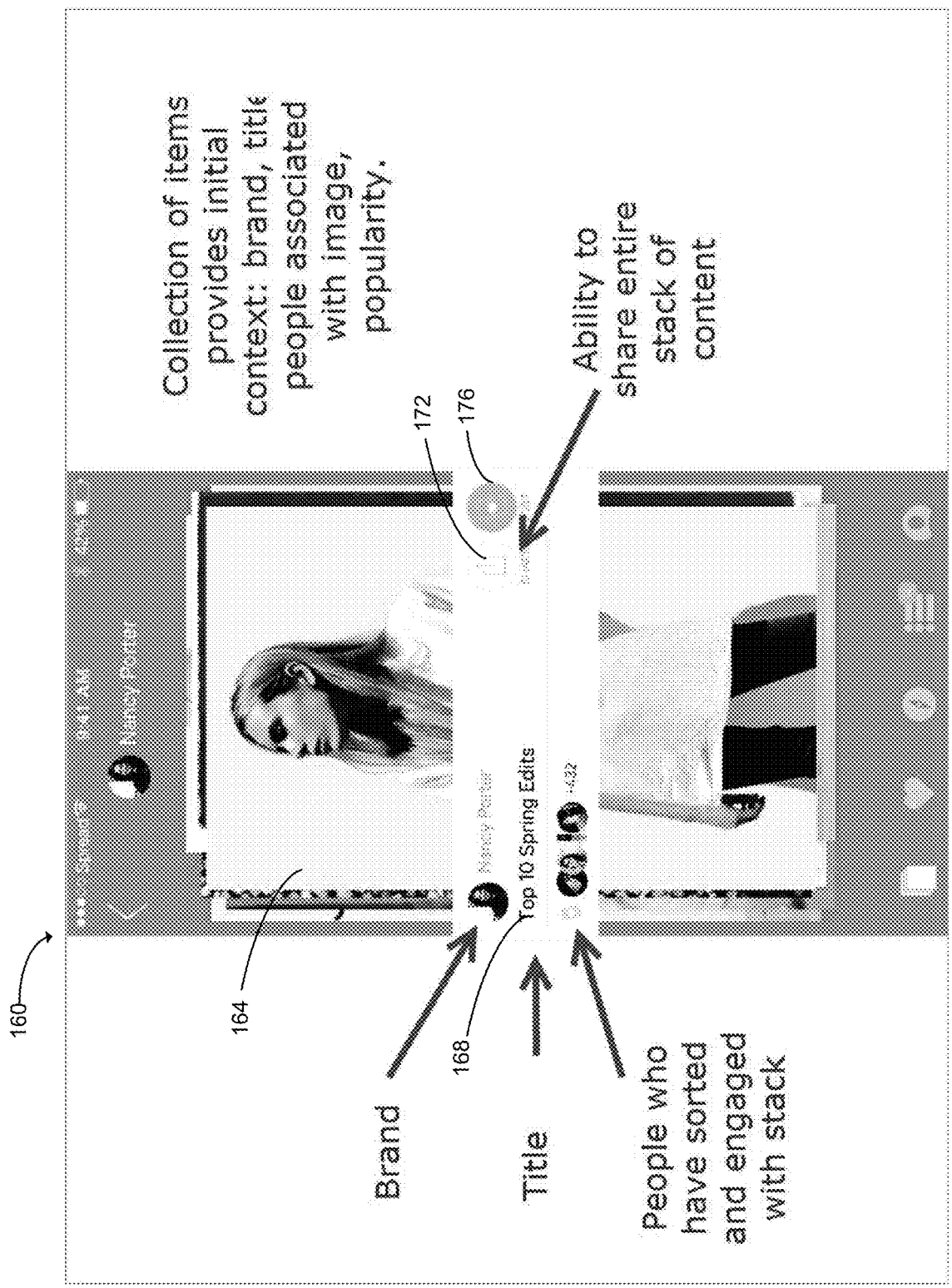
FIG. 5 illustrates a capture of an exemplary feedback providing environment.

Referring now to FIG. 5, therein illustrated is a capture of an exemplary feedback providing environment 160 for a feedback providing session. Within the environment, a stack of content items 164 is displayed on the touch display screen 18. A single content item may also be displayed. An identifier 168 of the stack is also displayed. The feedback providing environment 160 further displays a first user-selectable item 172 for sharing the content item or stack of content items and a second user-selectable item 176 for initiating the providing of feedback for the content item or stack of content items.

The content item displayed on the touch display screen 18 can be viewed by the feedback providing user. The user can then enter his or her feedback to the content item by interacting with touch display screen 18. The interaction includes the user contacting the touch display screen 18 while the content item is currently being displayed.

The feedback receiving system 42 includes a feedback receiving module 56. Within a feedback providing session, the feedback receiving module 56 defines, with respect to the touch display screen 18, a first direction of the touch display screen and a second direction of the touch display screen. By defining the touch display screen 18 in this way, a user contact with the touch display screen can indicate both a first directional value in the first direction, and a second directional value in the second direction.

The feedback receiving module 56 is further operable to detect a user contact with the touch display screen when the touch display screen is displaying the content item for which feedback is to be provided. From the user contact, the feedback receiving module 56 is further operable to determine the first directional value and the second directional value of the user contact.

According to various exemplary embodiments, the touch display screen 18 is substantially planar and the first direction and the second direction are defined with respect to a portion of or a whole of the touch display screen 18. In other examples, the touch display screen 18 may have a substantially planar portion and curved portions (ex: curved edges), and the first direction and the second direction are defined with respect to the substantially planar portion of the touch display screen 18. Accordingly, defining the first direction and the second direction of the touch display screen includes defining a substantially Cartesian coordinate system. The Cartesian coordinate system includes the first direction and the second direction, the second direction being substantially orthogonal to the first direction. Both the first direction and the second direction are substantially parallel to the planar portion of the touch display screen 18. Alternatively, other coordinate system can be used to provide the two dimensions of input. For example, polar coordinates could be used on a substantially planar touch display screen 18, by, say, defining a clockwise rotation as a positive input, and a clock counter clockwise rotation as a negative input, where the radius of the clockwise rotation indicates a magnitude of the positive input. That is, a clockwise rotation with a relatively large radius would indicate a strong degree of liking or preference, while a clockwise rotation with a relatively small radius would indicate a more marginal or smaller degree of liking.

Figure 6A:
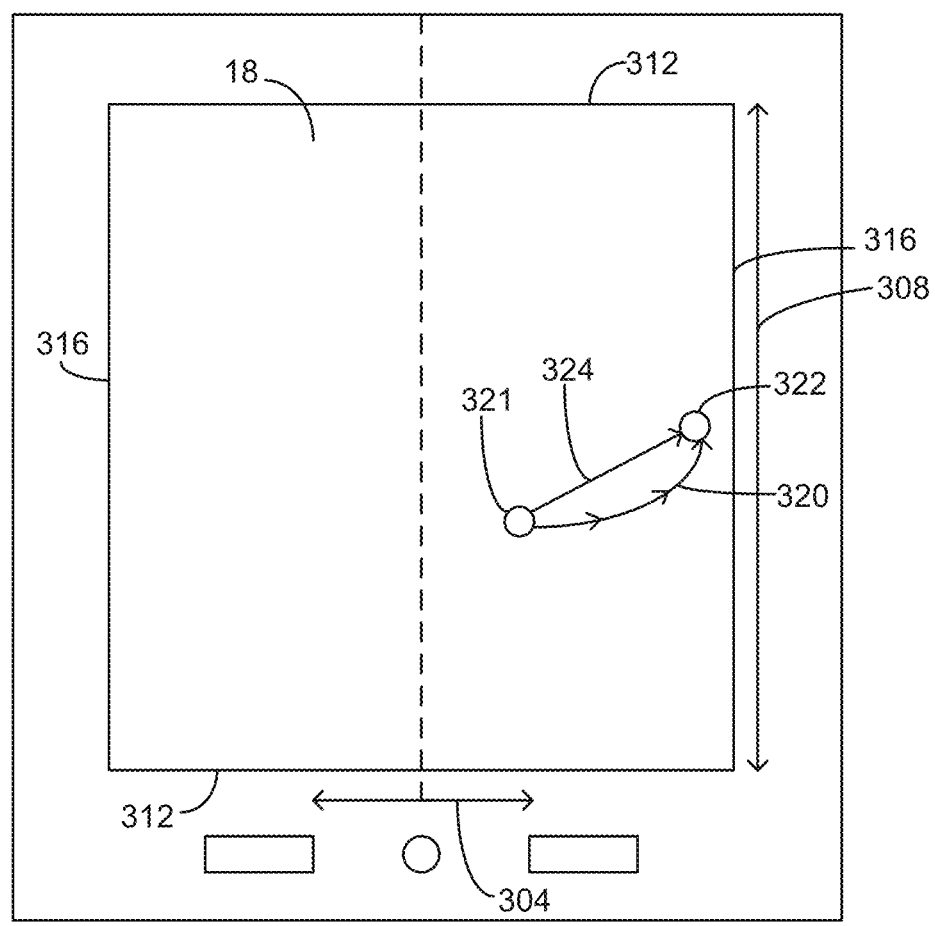
FIG. 6A illustrates a plan view of a user device and its touch display screen and a defining of the first direction and the second direction of the touch display screen according to one example.

Referring now to FIG. 6A, therein illustrated is a plan view of a user device 16 and its touch display screen 18 according to one example of defining the first direction and the second direction of the touch display screen 18. As illustrated, the touch display screen 18 is substantially rectangular shaped and includes a first pair of opposing sides 312 and a second pair of opposing sides 316, the second pair being substantially orthogonal to the first pair.

For example, the first pair of opposing sides 312 may be short sides of the touch display screen 18 and the second pair of opposing sides 316 may be long sides of the touch display screen. A first direction 304 is defined as being substantially parallel to the first pair of opposing sides 312 and a second direction 308 is defined as being substantially parallel to the second pair of opposing sides 312. This may be the case for a touch display screen 18 wherein the user is viewing user device 16 placed in a portrait orientation (ex: often the case of a tablet or smartphone).

Alternatively, the first pair of opposing sides 312 may be long sides of the touch display screen 18 and the second pair of opposing sides 316 may be short sides of the touch display screen 18. Accordingly, the first direction 304 is defined as being substantially parallel to the second pair of opposing sides 316 and the second direction 308 is defined as being substantially parallel to the first pair of opposing sides 312. This may be the case for a touch display screen 18 wherein the user is viewing the user device 16 placed in a landscape orientation.

According to various exemplary embodiments wherein the touch display screen 18 is viewable in both the portrait orientation and the landscape orientation, the feedback receiving module determines the current orientation of the touch display screen 18 and defines the first direction 304 and the second direction 308 based on the current orientation. It will be appreciated that within a substantially rectangular touch display screen 18 and based on the current orientation of the user device 16 with respect to the feedback providing user, the first direction 304 may be defined as a left-right direction of the touch display screen 18 and the second direction 308 may be defined as an up-down direction of the touch display screen 18.

According to various exemplary embodiments, the user contact includes a swiping motion and the feedback receiving module 56 determines the first directional value and the second directional value from this swiping motion. The swiping motion refers to a motion wherein user contact with the touch display screen 18 is initiated at a first location 321 of the touch display screen 18. User contact is continued (i.e. contact with the touch display screen 18 is not ceased) as the user contact is moved to a second location 322 of the touch display screen 18. The first location 321 and the second location 322 have a non-zero distance between one another.

Referring back to FIG. 6A, a swiping motion user contact defines a swiping path 320, which corresponds to the path traveled within the swiping motion.

According to one exemplary embodiment, the first directional value and the second directional value is determined from a vector 324 defined by the swiping motion. The vector 324 may be the one extending between the first location 321 of the user contact and the second location 322 of the user contact. The first directional value may be determined based on the component of the vector 324 in the first direction 304. The second directional value may be determined based on the component of the vector 324 in the second direction 308.

According to another exemplary embodiment, the first directional value and the second directional value are determined based on the second location 322 of the touch display screen 18. The first directional value may be determined based on the coordinate of the second location 322 in the first direction 304. The second directional value may be determined based on the coordinate of the second location 322 in the second direction 308.

According to yet another exemplary embodiment, the first directional value and the second directional value are determined based on a combination of the vector 324 and the coordinate values of the second location 322. For example, the first directional value may be determined based on the component of the vector 324 in the first direction 304. For example, the second directional value may be determined based on the coordinate of the second location 322 in the second direction 308.

According to various exemplary embodiments, the first directional value and the second directional value determined from the user contact that is a swiping motion may be updated as the swiping motion is ongoing. The second location 322 of the swiping motion user contact may be a current location of the user contact within the swiping motion. As the swiping motion is continued, the second location/current location 322 will be changed. Accordingly, an updated first directional value and/or second directional value may be determined for the changed second location/current location 322. For example, the second location/current location may be monitored and the first directional value and/or second directional value may be updated intermittently.

According to various exemplary embodiments, the first directional value and the second directional value can be determined by extrapolating a trajectory of the swiping motion. For example, a trajectory may be extrapolated based on the vector 324 defined by the swiping motion. This may include extending the vector 324 beyond the end of the swiping motion. For example, the first directional value and the second directional may be determined based on the location of the extrapolated trajectory when the trajectory reaches an edge of the touch display screen 18.

In a further example, the vector 324 may be a current direction of the swiping motion, such as a tangent to the most recent portion of the path of the swiping motion. Accordingly, the extrapolated trajectory may be determined from the current direction of the swiping motion. This swiping motion can, but need not, be determined from continuous contact with the touch display screen 18. For example, instead of the contact with the touch display screen 18 being continuous, it might be intermittent.

According to various exemplary embodiments, the first directional value determined from the user contact is a binary value (i.e. the first directional value is chosen from one of two possible values).

For example, the first directional value may be determined based on whether the vector 324 defined by the swiping motion user contact is positively oriented or negatively oriented in the first direction 304. If the vector 324 is positively oriented, the first directional value is determined to be the first (ex: positive) of the two possible values. If the vector 324 is negatively oriented, the first directional value is determined to be the second (ex: negative of the two possible values). For example, within a substantially rectangular touch display screen 18 being held and viewed by a user, the positive orientation may be a rightwise orientation of the vector 324 and the negative orientation may be a leftwise orientation of the vector 324.

Alternatively, the first directional value may be determined based on the coordinate of the second location 322 of the user contact in the first direction 304. For example, the second location 322 of the user contact in the first direction may be defined with respect to a center line 328 of the touch display screen 18. The center line 328 may be oriented in the second direction 308 and located at the midpoints between the second pair of opposing sides 316. The first directional value is determined to be the first (ex: positive) of the two possible values if the current location 322 is located on one side of the center line 328. The first directional value is determined to be the second (ex: negative) of the two possible values if the current location 322 is located on the other side of the center line 328. For example, within a substantially rectangular touch display screen 18 being held and viewed by a user, the one side of the center line 328 may be to the right of the center line 328 and the other side of the center line 328 may be to the left of the center line 328.

According to another exemplary embodiment, the first directional value may be determined based on the second location of the user contact being located within predefined regions of the touch display screen 18.

Figure 6B:
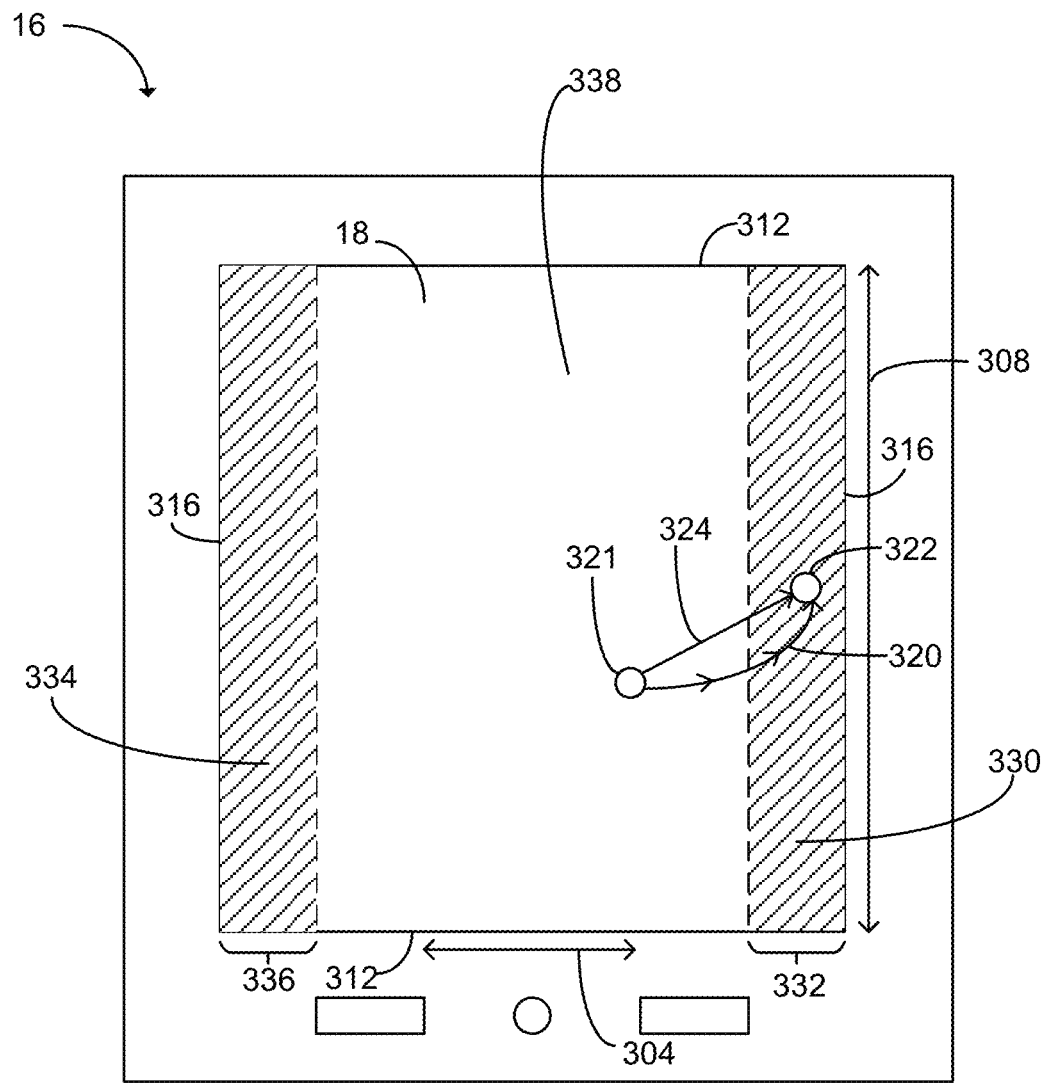
FIG. 6B illustrates a plan view of a user device and its touch display screen and a defining of the first direction and the second direction of the touch display screen according to another example.

Referring now to FIG. 6B, therein illustrated is a plan view of a user device 16 and its touch display screen 18 and a defining of the first direction and the second direction of the touch display screen according to a second example. For example, and as illustrated, a first region 330 may be defined near a first of the second pair of opposing sides. The first region may be specifically defined as a region that falls within a predetermined distance 332 of the first of the second pair of opposing sides 316. When the second location 322 of the user contact is located within the first region 330, it is determined that the first directional value has a first (ex: positive) of its two possible values.

A second region 334 may be further defined near a second of the second pair of opposing sides 316. The second region 334 may be specifically defined as a region that falls within a predetermined distance 336 of the second of the second pair of opposing sides. When the second location of the user contact is located within the second region 334, it is determined that the second directional value has a second (ex: negative) of its two possible values.

For example, and as illustrated, the first region 330 corresponds to a region of the touch display screen 18 that extends along a right side of the touch display screen 18 according to its current orientation and the second region 334 corresponds to a region of the touch display screen 18 that extends along a left side of the touch display screen 18.

According to some exemplary embodiments, if the second location 322 of the user contact is in neither of the defined regions 330 and 334, the first directional value is determined to be undefined.

According to some exemplary embodiments, a first directional value is determined only if the swiping motion starts in a center region 338 between the two defined regions 330, 334 (i.e. first location is in the center region 338) and continues into one of the defined regions 330, 334 (i.e. the second location is in one of the defined regions 330 and 334). Accordingly, a user needs to perform a swiping motion user contact includes a significant left-right component.

According to various exemplary embodiments, the second directional value determined from the user contact is a magnitude value (i.e. the second directional value is chosen from a set of more than two possible values).

According to exemplary embodiments wherein the user contact defines a vector 324 between a first location 321 and a second location 322, the second directional value may be determined to be the distance between the first location 321 and the second location 322 along the second direction 308. For example, within a substantially rectangular touch display screen 18 being held and viewed by a user, the second directional value may indicate how far the user contact traveled in the up-down direction of the touch display screen 18.

Alternatively, the second directional value may be determined based on the coordinate of second location 322 along the second direction. For example, the coordinate of the second location may be a distance of the second location 322 from a reference line, such as a distance of the second location 322 from the upper of the first pair of opposing sides 312 or a distance of the second location 322 from the lower of the first pair of opposing sides 312. The magnitude value of the second directional value may represent this distance.

The feedback providing user performs the user contact while the electronic item is displayed in order to provide feedback about the electronic item. The feedback has two components represented by the first directional value and the second directional value.

For example, a first component is whether the user reacts positively or negatively to an item. A positive reaction may be the user liking the content item. A negative reaction may be the user disliking or "passing over" the item. The first component of the feedback is determined from the first directional value, wherein a first of the possible values of the first directional value indicates the positive reaction and the second of the possible values indicate a negative reaction. For example, within a substantially rectangular touch display screen 18 being held and viewed by a user, the positive reaction or the negative reaction is determined from the user having swiped right or left within the user contact.

For example, a second component is the degree of how much the user reacts positively or negative to the displayed content item. The second component is determined from the second directional value, wherein the second directional value as a magnitude value represents the degree of the reaction. For example, within a substantially rectangular touch display screen 18 being held and viewed by a user, the degree of a reaction can be determined from how far the user contact traveled in the second (ex: up-down) direction with respect to the location of the start of the user contact. Alternatively, within a substantially rectangular touch display screen 18 being held and viewed by a user, the degree of a reaction can be determined from the section 322 of the user contact with respect to the reference line.

For example, a user may swipe upwardly or close to a top of the screen 18 to indicate a stronger reaction, such as a strong like or strong dislike. A user swiping substantially sideways (without moving upwards or downwards) or swiping closer to the middle of the screen may indicate an intermediate or neutral like or dislike. A user swiping downwardly or swiping close a bottom of the screen 18 may indicate a mild like or mild dislike. A user may further swipe in between these positions to indicate degrees of the reaction between strong, neutral and mild.

The feedback receiving system includes a response determining module 64 that determines a response to the user contact based on the first directional value and the second directional value determined from the user contact. The response may be further determined based on the content item that is displayed while the user contact is occurring.

According to various exemplary embodiments, the first directional value and the second directional value can be determined based on a current location (ex: second location 322) of the user contact. A response that is determined may include providing a feedback indicator. As described below, this indicator could be visual, auditory, and tactile or any combination thereof.

According to one exemplary embodiment, providing a feedback indicator includes displaying a visual indicator item that is indicative of the first directional value and the second directional value. The visual indicator item that is displayed may vary depending on the first directional value and the second directional value.

A visual first characteristic of the visual indicator item may be determined based on the first directional value. The first characteristic may be the shape or color of the indicator item. A first shape may be displayed when the first directional value has the first of its possible values.

For example, a heart or thumbs up is displayed when the first directional value indicates a positive reaction. For example, an "X" or thumbs down is displayed when the first directional value indicates a negative reaction.

Alternatively, or additionally, a first color (ex: green) is displayed when the first directional value indicates a positive reaction and a second color (ex: red) is displayed when the first directional value indicates a negative reaction.

A second visual characteristic of the visual indicator item may be determined based on the second directional value. The second characteristic may be a size or intensity of the indicator item. The second characteristic may be based on the magnitude value of the second directional value.

According to another exemplary embodiment, providing a feedback indicator includes emitting an auditory indicator. The auditory indicator may be a sound that is played back on the user device. The sound that is played back may vary depending on the first directional value and the second directional value.

According to yet another exemplary embodiment, providing a feedback indicator includes providing a tactile indicator. The tactile indicator may be provided by operating the user device 16, such as causing the user device 16 to vibrate. The tactile indicator that is provided may vary depending on the first directional value and the second directional value.

In some exemplary embodiments, a combination of two or more of the visual indicator, auditory indicator, and tactile indicator may be provided.

According to various exemplary embodiments, the location of the indicator item that is displayed can be determined based on the first directional value and the second directional value. For example, the indicator item may be displayed along a first side of the second pair of opposing sides 316 when the reaction is positive and displayed along a second side of the second pair opposing sides 316 when the reaction is negative. The location of indicator item along the first side or second side is further determined based on the second directional value. For example, the location may correspond to the current location 322 of the user contact in the second direction 308. Alternatively, the location represents the current component in the second direction 308 of the vector 324 defined by the user contact According to various exemplary embodiments, the first visual characteristic of the displayed indicator item is adjusted based on a change in the first directional value. The second visual characteristic of the displayed indicator item may also be adjusted based on a change in the second directional value. The changes of the first directional value and/or second directional value may be monitored such that the one or more adjustments to the displayed visual indicator item appears in real time to the user.

Referring now to FIGS. 7A to 7G, therein illustrated are captures of an exemplary feedback providing environment 400 during an ongoing feedback providing session.

Figure 7A:
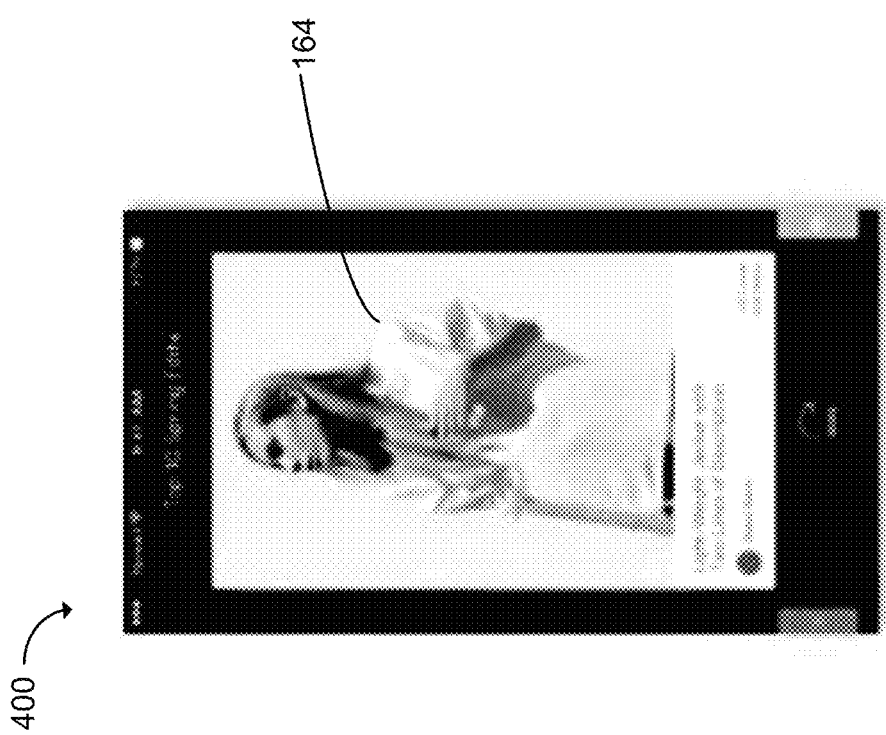

In FIG. 7A, user contact has not yet been detected. Accordingly an indicator item is not yet displayed.

Figure 7B:
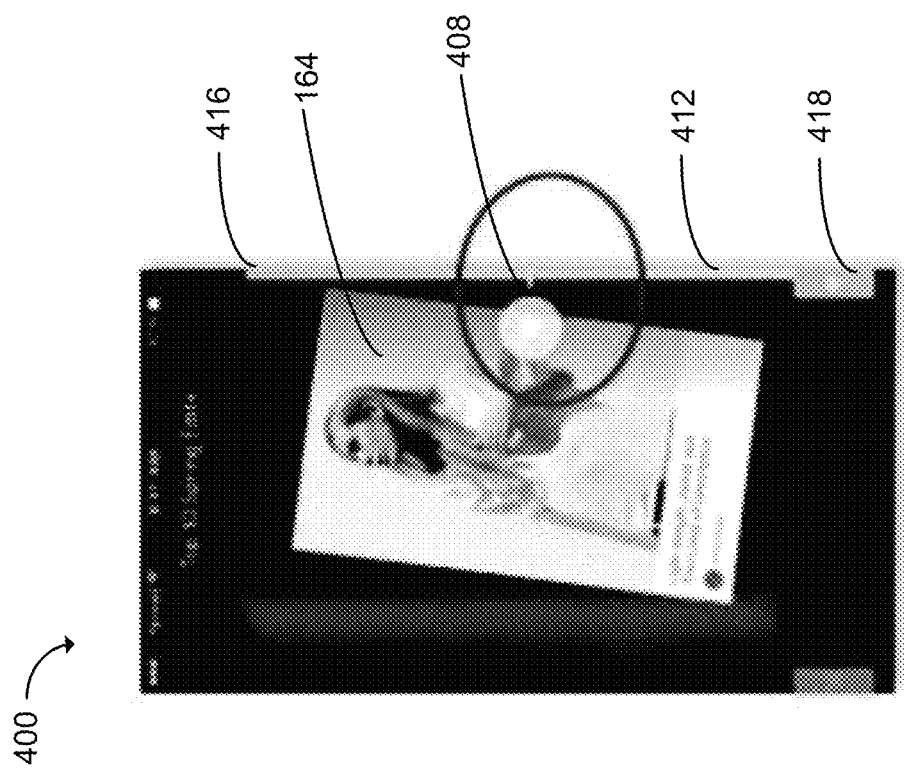

In FIG. 7B, a user contact has been detected and it is determined that the first directional value is a positive reaction. Accordingly, an indicator item 408 showing a heart is displayed. Furthermore, the second directional value has a magnitude that is at or close to the middle of possible values, thereby representing an intermediate or neutral degree of the reaction. A slider 412 is further displayed to represent the range of degrees of the reaction. For example, the indicator item 408 is displayed at an intermediate location between top end 416 and bottom end 418 of the slider 412.

Figure 7C:
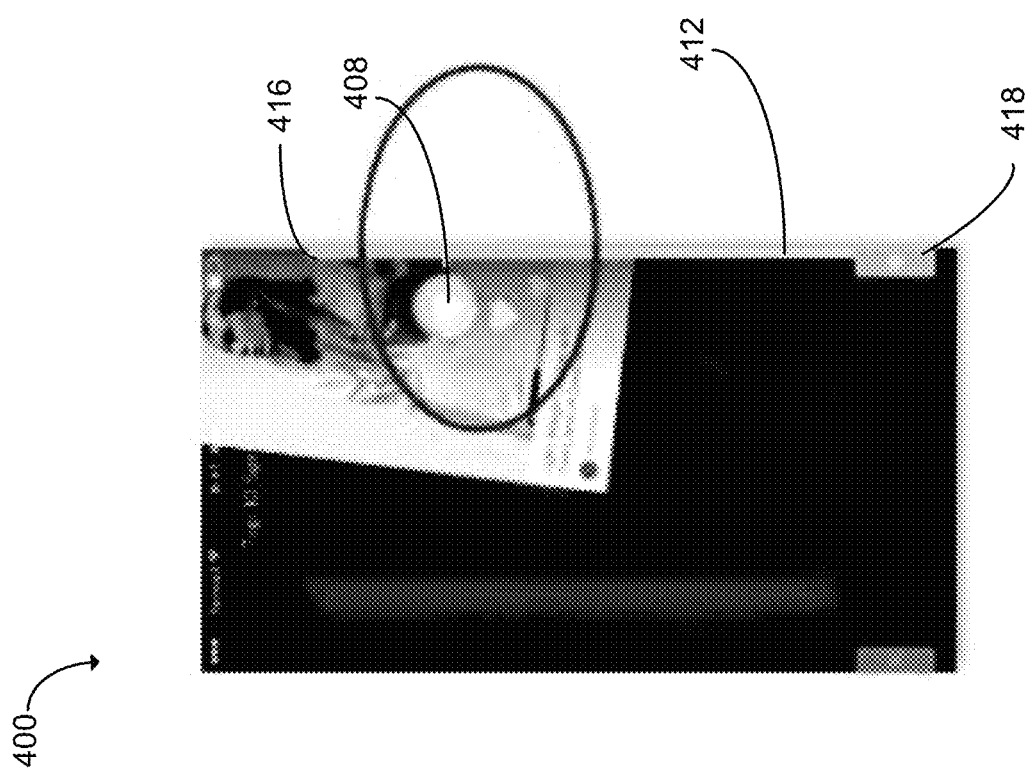

In FIG. 7C, a change in the current location of the user contact has been detected. In this case, the second directional value has been changed to a greater magnitude value to indicate a stronger degree of the positive reaction. Accordingly, the amount of color applied to the visual indicator item 408 has been increased. Furthermore the indicator item 408 has been moved closer to the top end 416 of the slider 412.

In FIG. 7D, a further change in the current location of the user contact has been detected. In this case, the second directional value has been changed to an even greater magnitude value to indicate an even stronger degree of the positive reaction. Accordingly, the size of the indicator item 408 has further increased. The intensity of the indicator item 408 has also been increased (ex: made darker). Furthermore the indicator item 408 has been moved to the top end 416 of the slider 412 to indicate that the strongest degree of the reaction has been reached.

Figure 7E:
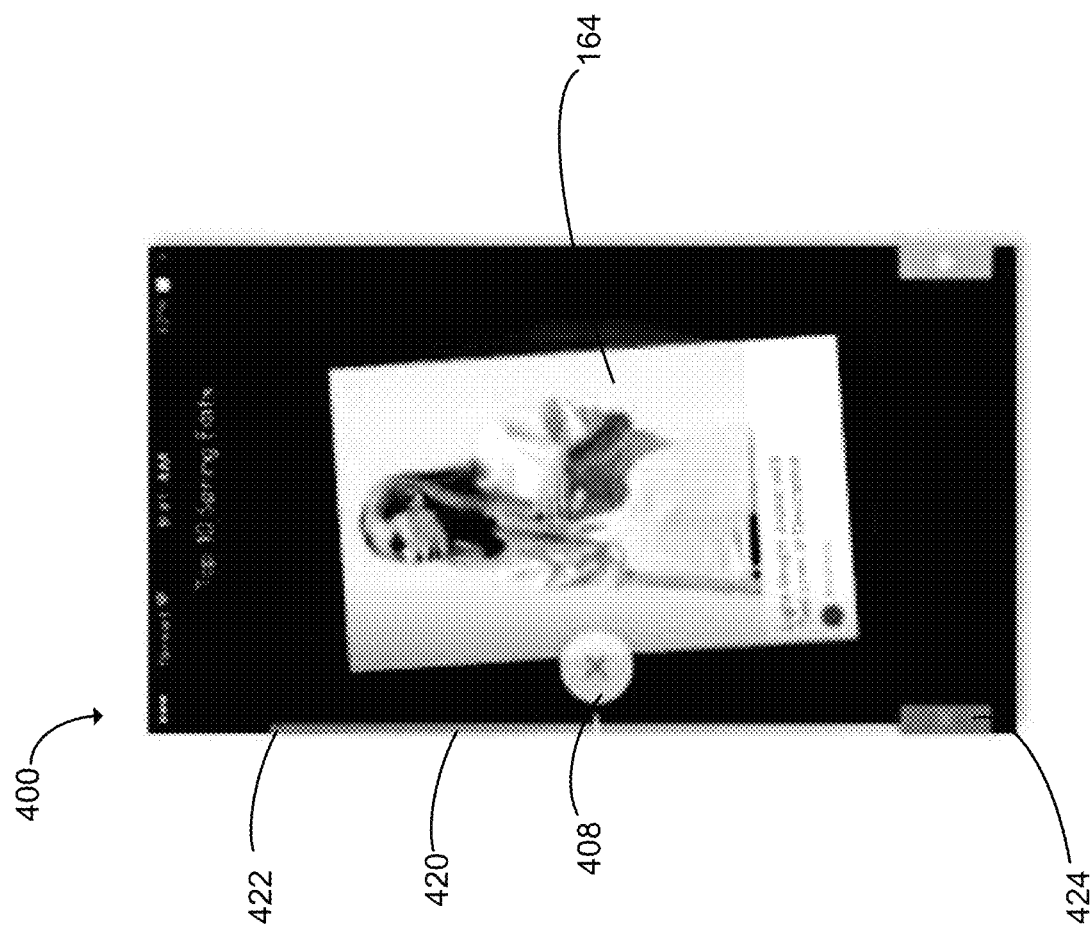

In FIG. 7E, a user contact has been detected and it is determined that the first directional value is a negative reaction. Accordingly, an indicator item 408 showing an "X" is displayed. Furthermore, the second directional value has a magnitude that is at or close to the middle of possible values, thereby representing an intermediate or neutral degree of the reaction. A second slider 420 is displayed along the leftwise side to represent the range of degrees of the reaction. For example, the indicator item 408 is displayed at an intermediate location between top end 422 and bottom end 424 of the slider 420.

Figure 7F:
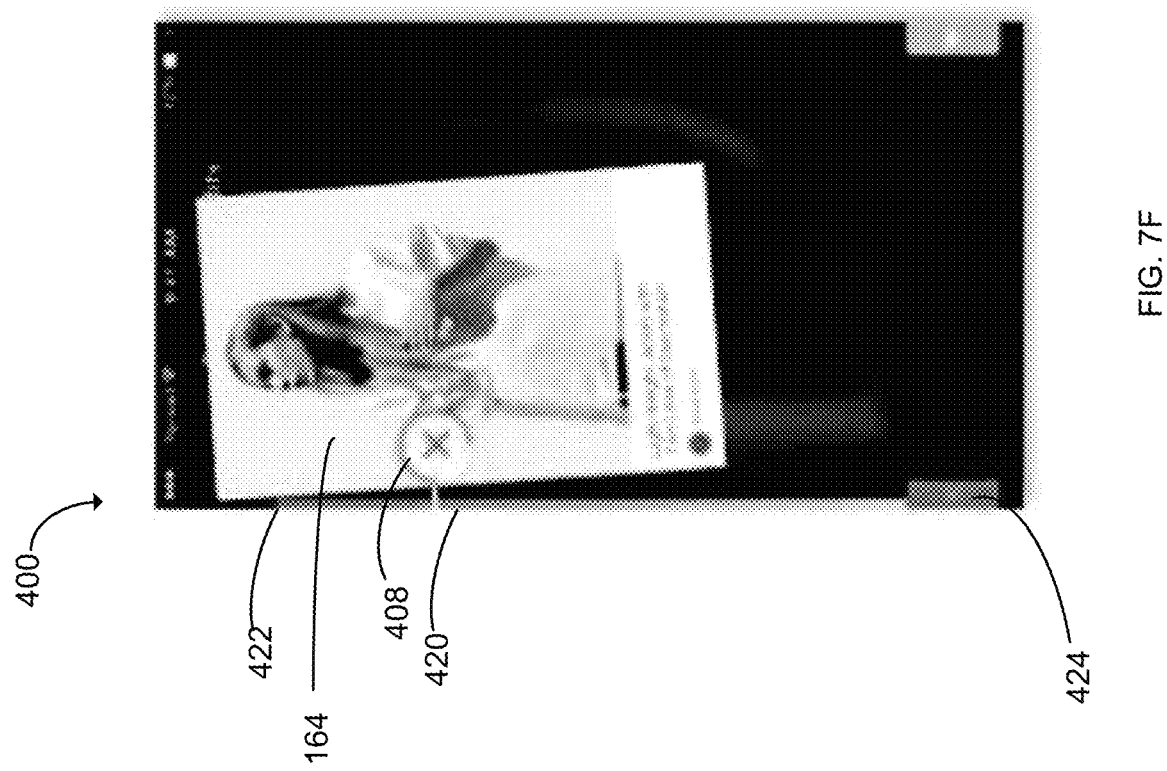

In FIG. 7F, a change in the current location of the user contact has been detected. In this case, the second directional value has been changed to a greater magnitude value to indicate a stronger degree of the negative reaction. Accordingly, the intensity of the indicator item 408 has been increased by illustrating a ring surrounding the X indicator item 408. Furthermore the indicator item 408 has been moved closer to the top end 422 of the slider 420.

Figure 7G:
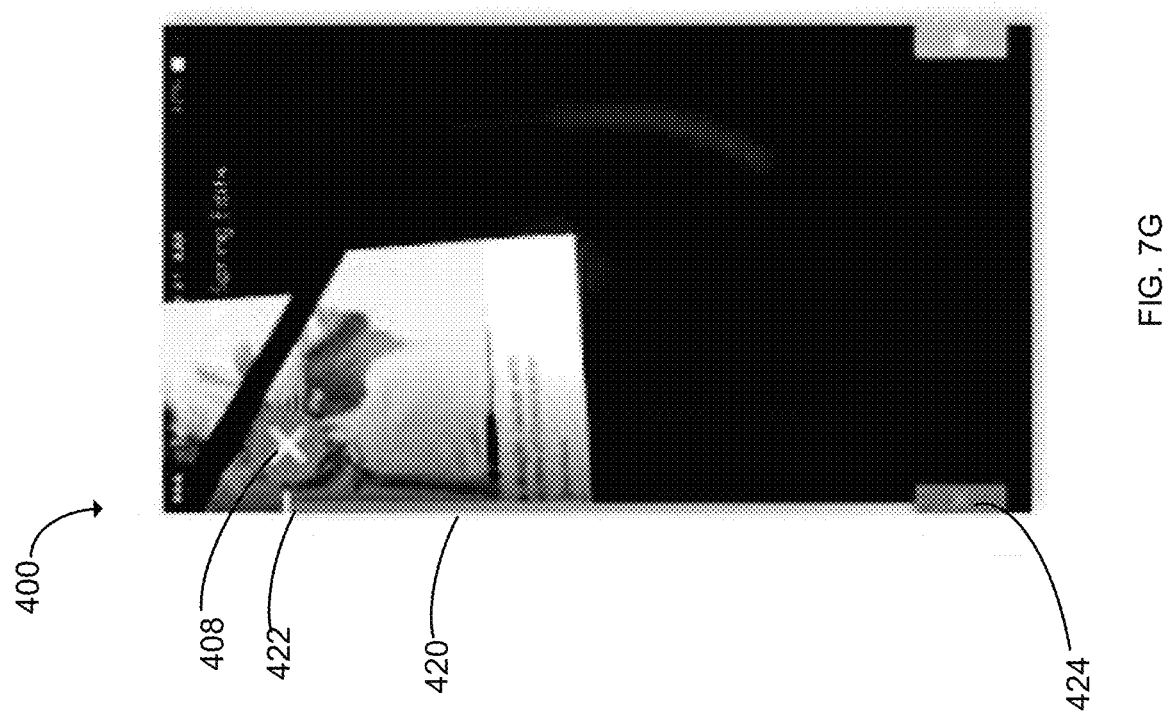

In FIG. 7G, a further change in the current location of the user contact has been detected. In this case, the second directional value has been changed to an even greater magnitude value to indicate an even stronger degree of the negative reaction. Accordingly, the size of the indicator item 408 has increased. The intensity of the indicator item 408 has also been increased (ex: made darker). Furthermore the indicator item 408 has been moved to the top end 420 of the slider 418 to indicate that the strongest degree of the reaction has been reached. Moreover, a cut is made to the displayed content item, thereby separating the content item into two pieces, to further illustrate a negative reaction.

According to various exemplary embodiments, a response that is determined may include determining a message based on the first directional value and the second directional value. The response may be further determined based on the content item that is displayed while the user contact is occurring. The response may further include sending the message to the user. The sent message may include the message being visually displayed on the touch display screen 18.

The message may be displayed immediately after the user contact is ended. In this case, the first directional value and the second directional value are determined based on the second location 422 of the user contact at the time the user contact is terminated.

The message may include a text string that is determined based on the first directional value and the second directional value. The text string may reflect the reaction and the degree of the reaction of the user provided feedback. The text string may be displayed on the touch display screen 18.

The message that is displayed may further include a set of user-selectable items. Each user-selectable item may correspond to a unique one of a set of sub-options. A user may interact with one or more of the user-selectable items in order to select one or more of the sub-options and include these in the feedback that is provided by the user.

The set of user-selectable items and the set of sub-options represented by it may be determined based on the first directional value and the second directional value. For example, where a positive reaction is determined from the first directional value, the sub-options for characterizing the feedback. In the example of a content item being a fashion content item, the sub-options may be "I have it", "I want it", and "I love it". For example, where a negative reaction is determined from the first directional value, the sub-options may be "I hate it", "I don't want it" and "not for me".

A further user contact with the touch display screen 18 may be detected wherein a user selection of one of the user-selectable items is determined in the second user contact.

According to various exemplary embodiments, the response may further include transmitting the message determined from the first directional value and the second directional value to a user other than the feedback providing user. For example, the message may include an indication (ex: text string, emoticon or both) that represent the first directional value and the second directional value. The message may include a further indication (ex: text string, emoticon or both) that represents the selection of one or more of the sub-options. The message may be transmitted over a social media network platform, such as Facebook, Twitter, Instagram or Spread.

Referring now to FIGS. 8A to 8E, therein illustrated are captures of an exemplary feedback providing environment 400 wherein a response is being displayed.

Figure 8A:
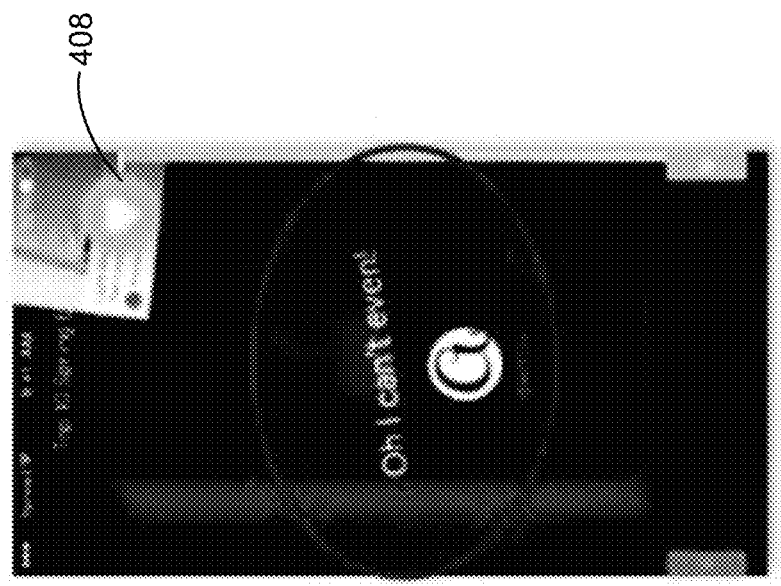
FIGS. 8A to 8E illustrate captures of an exemplary feedback providing environment 400 in which a message is determined in response to a user contact.

In FIG. 8A, the user contact has been detected and it is determined that user contact has a positive reaction (first directional value) of the strongest degree (second directional value). Accordingly, a message that includes a text string is determined as response. The text string is displayed on the touch display screen 18. The content of the text strings exhibits excitement, such as "Oh I can't even!".

Figure 8B:
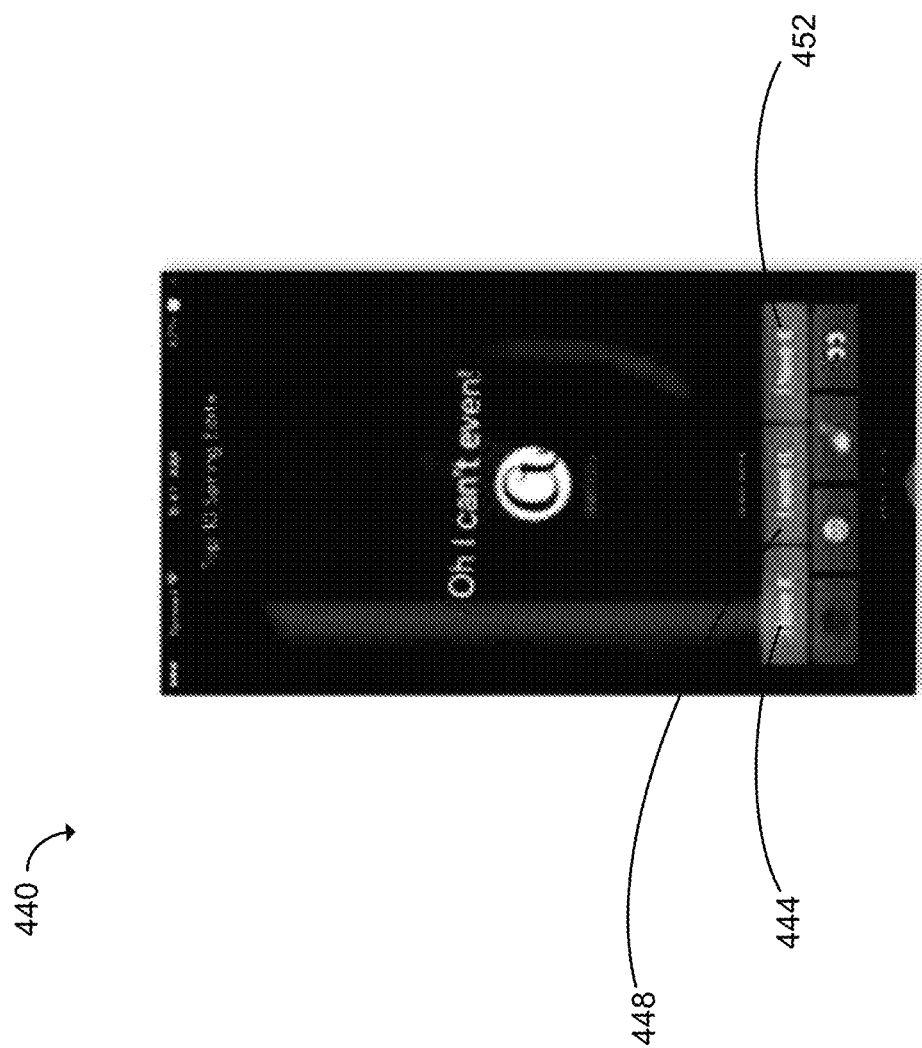

In FIG. 8B, a feedback messaging environment 440 includes a set of user-selectable items 444, 448, and 452 that have been displayed based on the first directional value and the second directional value.

Figure 8C:
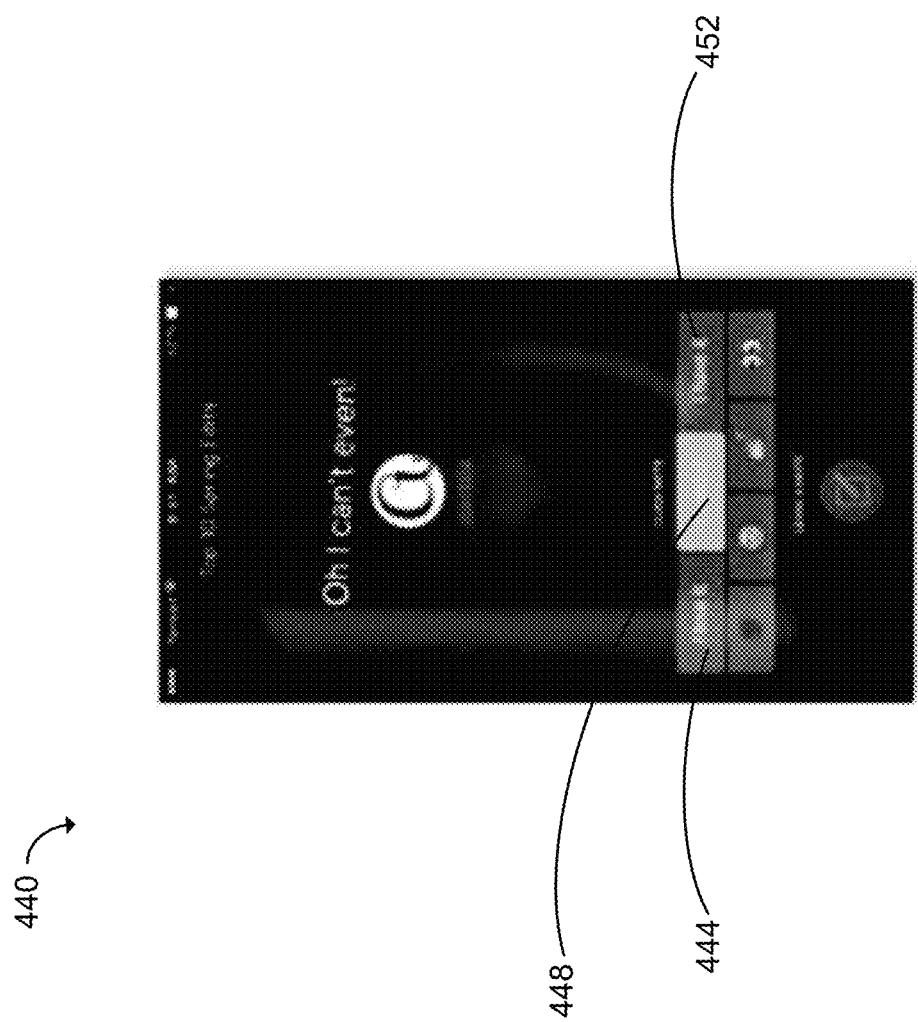

In FIG. 8C, one of the user-selectable items 448 has been selected and is shown as highlighted.

Figure 8D:
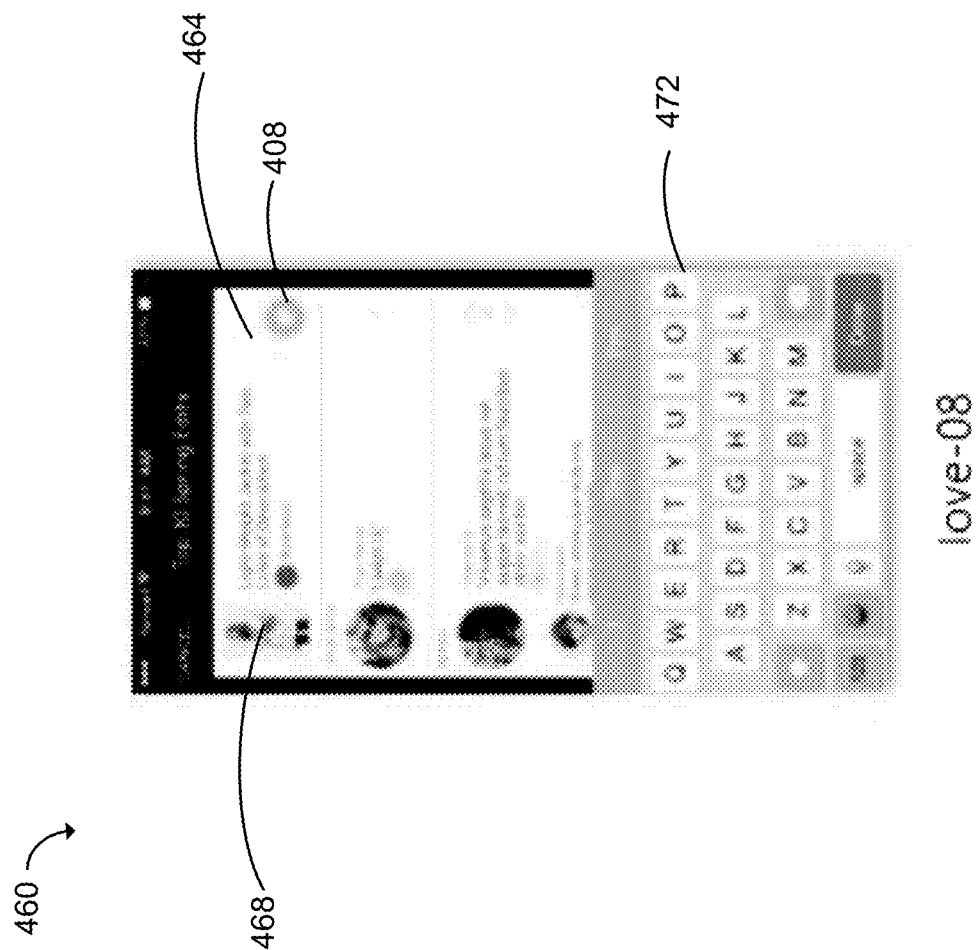

In FIG. 8D, a message constructing interface 460 is presented in which a social networking message 464 has been constructed. The social networking message includes a thumbnail 468 of the electronic content item for which the user has just provided feedback. The social network message 464 further includes the indicator item 408 having visual characteristics that represent the first directional value and the second directional value. The text message 464 may further include a text string that indicates the user selection of the sub-option within the second user contact. A user entry item 472, such as keyboard, is further displayed to allow the user to edit the social network message 464.

Figure 8E:
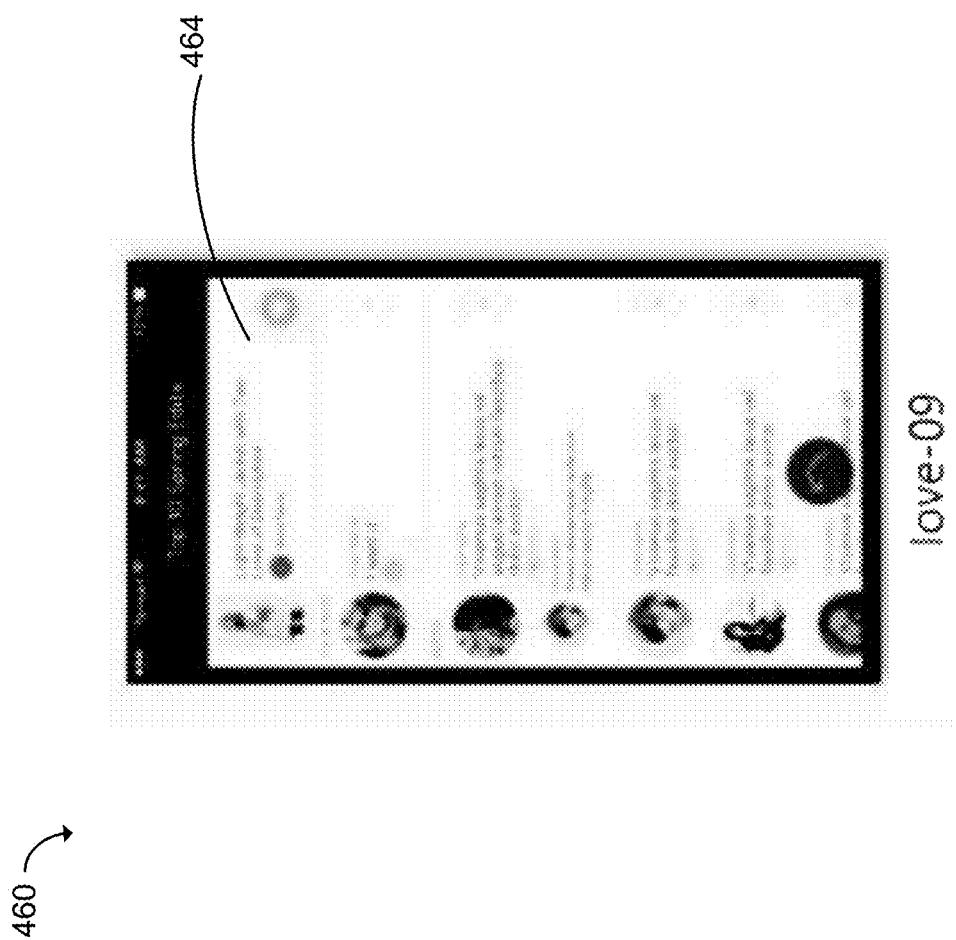

Referring now to FIG. 8E, a message feed shows the completed social networking messaging 464, which has been posted to the social networking platform.

According to various exemplary embodiments, a response that is determined may include recording a data entry for the feedback provided by the user based on the first directional value and the second directional value. The recorded data entry may be further determined based on the content item that is displayed while the user contact is occurring.

Figure 9:
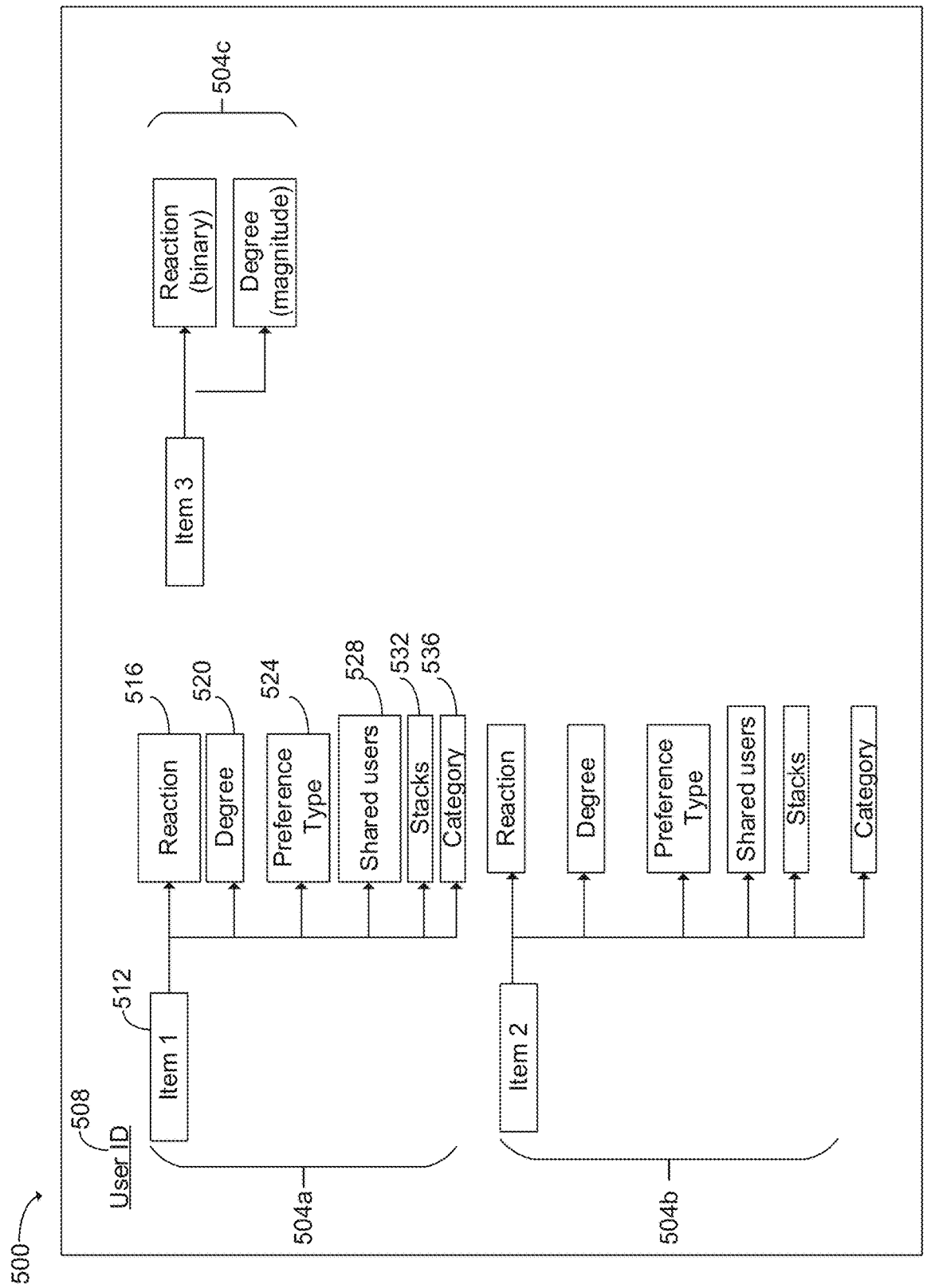
FIG. 9 illustrates a schematic diagram of an exemplary data structure for recording data entries for feedback provided by a user.

Referring now to FIG. 9, therein illustrated is a schematic diagram of an exemplary data structure 500 of recorded data entries for feedback provided by a user for various content items. For example, the recorded feedback data entries may be stored within the user database 52.

For a given content item for which feedback has been provided, a stored data entry 504 is associated with a user identifier 508. The stored data entry 504 includes an identifier 512 of the content item. The item identifier 512 is associated with a reaction entry 516 which may be determined based on the first directional value determined from the user contact received for the displayed content item. The reaction entry 516 may be the first directional value.

The item identifier 512 is also associated with a degree entry 520, which may be determined based on the second directional value determined from the user contact received from the displayed content item. The degree entry 520 may be determined based on the second directional value. Alternatively, the second directional value may be chosen from a set of possible values that has more members than a set of possible values for the degree entry 520. Accordingly, the degree entry value is determined from the second directional value.

The item identifier 512 may be further associated with a type entry 524. The type entry 524 indicates the sub-option selected by the user from interacting with the user-selected items displayed within a message sent to the user in response to the determining of the first directional value and the second directional value. The type entry 524 may further characterize the feedback provided by the user.

The item identifier 512 may be further associated with a shared user entry 528. The shared user entry 528 includes one or more user identifiers of other users with whom the given content item has been shared by the feedback providing user.

The item identifier 512 may be further associated with a stacks entry 532. The stacks entry 532 includes one or more stacks identifiers created by the feedback providing user that includes the given content item.

The item identifier 512 may be further associated with a categories entry 536. The categories may indicate category descriptors into which the given content item has been classified. The categories assigned to the content item may be defined by the creator of the content item or by the feedback providing user.

For example, within a feedback providing session, a category is determined for the content item that received feedback from the user. The recorded data entry for the feedback then includes a binary value for the user vis-à-vis that category in memory, the binary value being the positive reaction or the negative reaction.

Continuing with FIG. 9, it will be appreciated that three data entries 504 are stored for feedback received for three separate content items. The same entries are associated with item identifier 512b of the second stored data entry 504b as the first stored data entry 504a. An exemplary third data entry 504c is only associated with a reaction entry 516c and degree entry 520c. A type entry, shared users entry, stacks entry and category entry have not been defined for this third feedback entry 504c.

According to various exemplary embodiments, a plurality of content items are made available to the feedback providing user within a stack as a sequence of images. The feedback providing user provides his or her feedback to each of the images individually within the feedback providing session. Each image, when displayed, displays a corresponding item on the touch display screen 18.

As each item is displayed, a user contact with the touch display screen is detected. As a result, of sequence of user contacts are detected for the corresponding sequence of images. From each user contact for a corresponding displayed content item, a first directional value and a second directional value is also determined. As a result, a corresponding first directional value and a corresponding second directional value are determined for each user contact in the sequence of user contacts.

The images may be displayed sequentially one after another. As soon as a first directional value and a second directional value of a user contact is determined in relation to the corresponding item for each image in the sequence of images, the next image in the sequences of images is automatically displaying. This automatically displaying of images continues through the sequence of images except for the last image in the sequence of images.

Figure 10A:
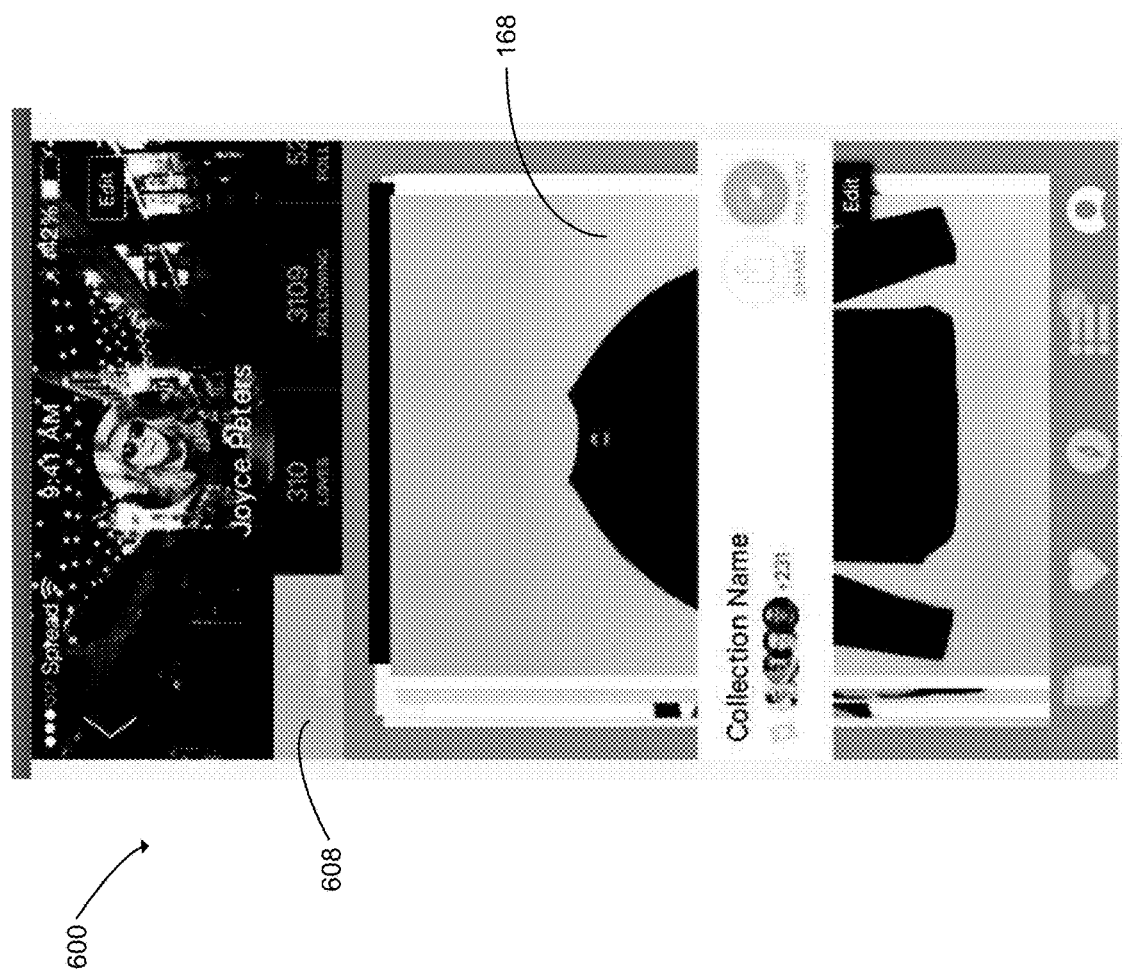
FIG. 10A illustrates an exemplary user environment for accessing content items to be reviewed.

FIG. 10A illustrates an exemplary user environment 600 for accessing content items to be reviewed and for which feedback is to be provided. The user environment 600 is provided to a user registered with the feedback receiving system 42, wherein information associated with the registered user is made available to the user. As shown in FIG. 10A, a stack of items 168 is made available under the stacks tab 608.

Figure 10B:
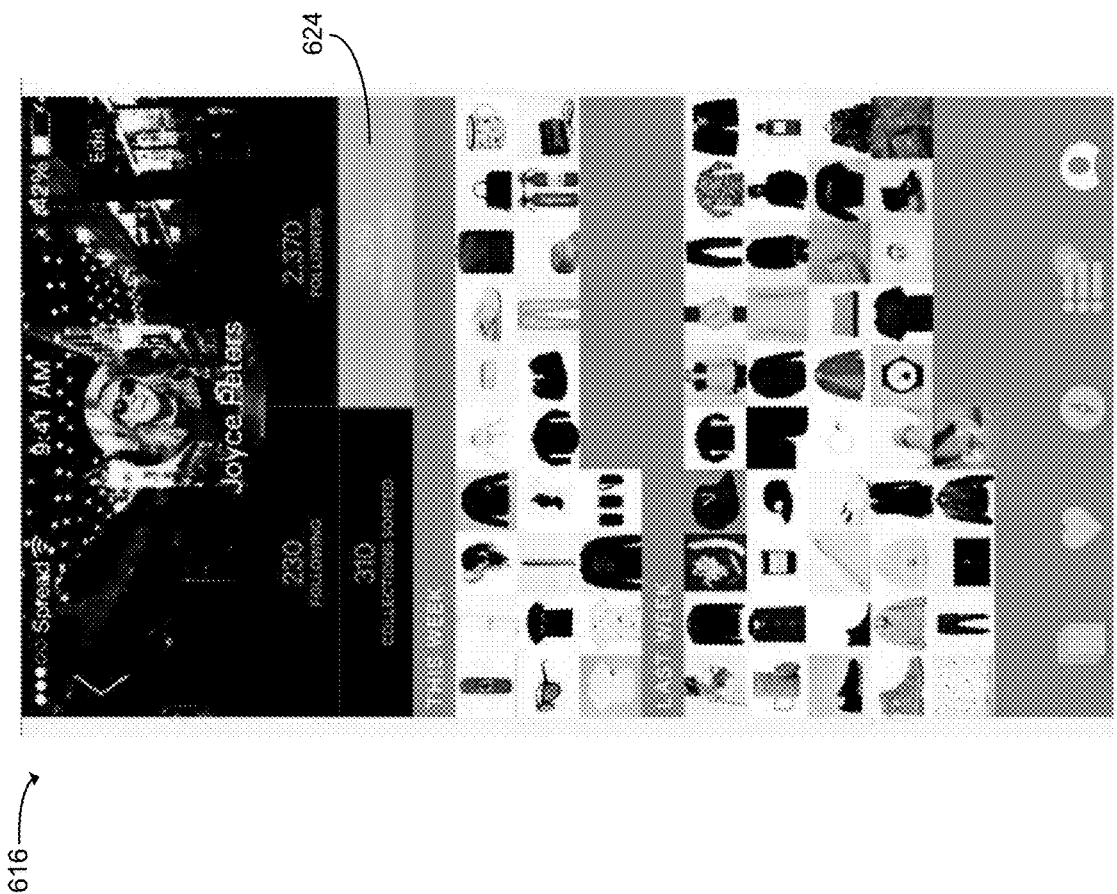
FIG. 10B illustrates an exemplary user environment for reviewing items that have received feedback from the user.

FIG. 10B illustrates an exemplary user environment 616 for reviewing items that have received feedback from the user. According to the illustrated example, a treated items tab 624 makes available to the registered user those content items that have received positive reaction from the user within a plurality feedback providing sessions. It will be appreciated that the content items to be reviewed are displayed in thumbnail format in a tiled arrangement. Each thumbnail tile can be selected so that the user can review the content item represented by the thumbnail.

Figure 10C:
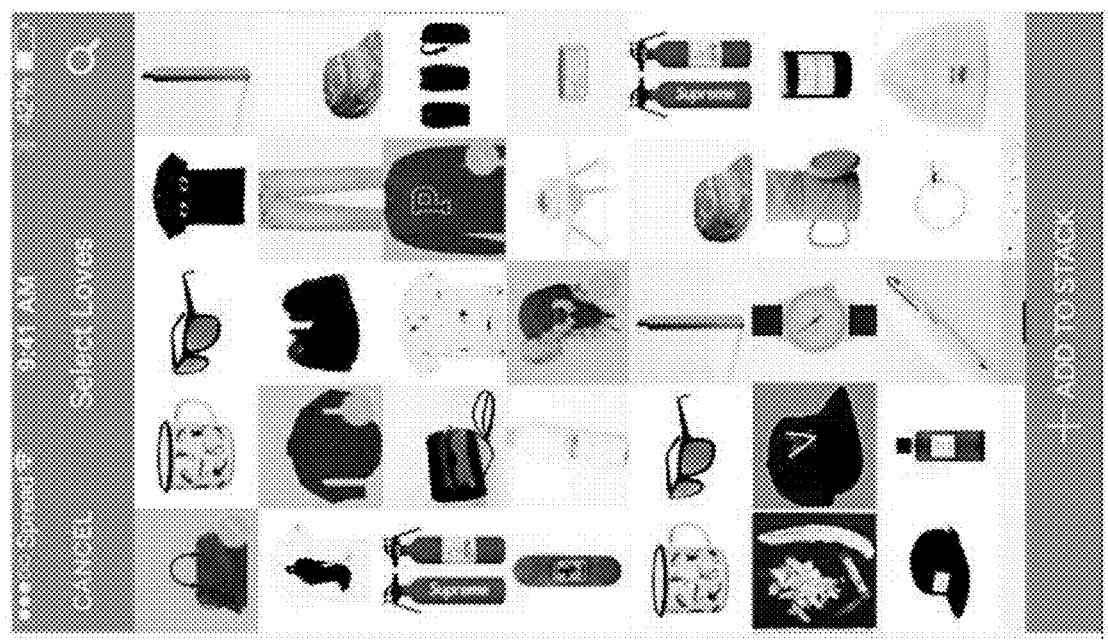
FIG. 10C illustrates an exemplary user environment for creating or updating a stack from reviewed items.

FIG. 10C illustrates an exemplary user environment 632 for creating or updating a stack from reviewed items. A plurality of content items are displayed on the touch display screen in thumbnail format in a tiled arrangement. A user may select content items to be included in a stack that is to be shared. Selected content items are marked with a selection indicator, such as a check mark.

Figure 10D:
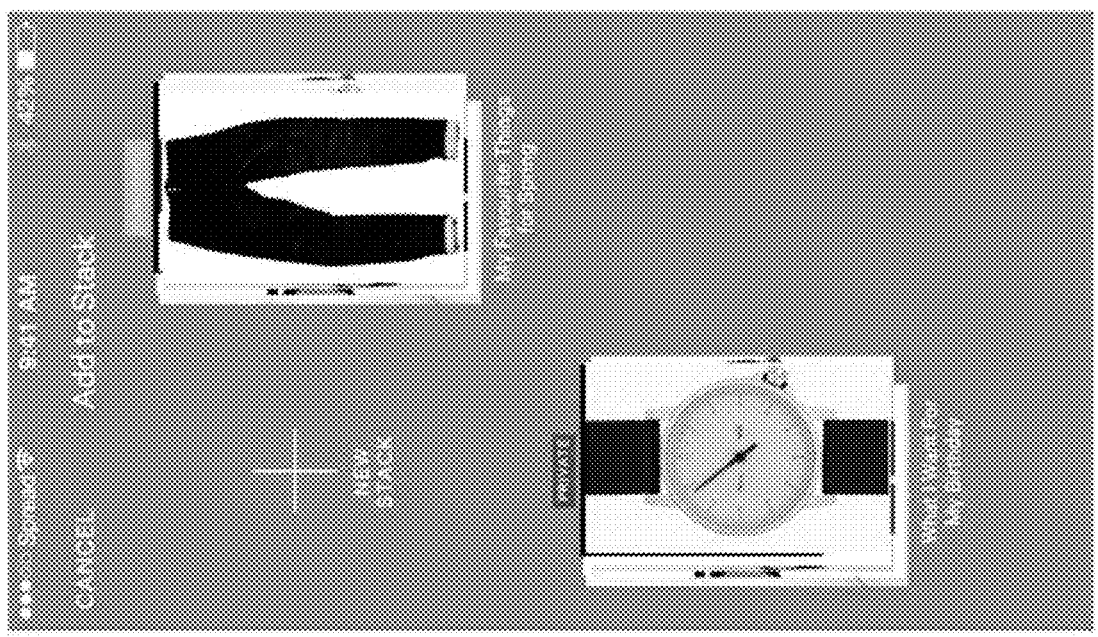
FIG. 10D illustrates an exemplary user environment for completing the stack creation or updating.

FIG. 10D illustrates an exemplary user environment 640 for completing the stack creation or updating. Previously created stacks are made available and displayed on the touch display screen. A create new stack option is also made available selection by the user.

Figure 10E:
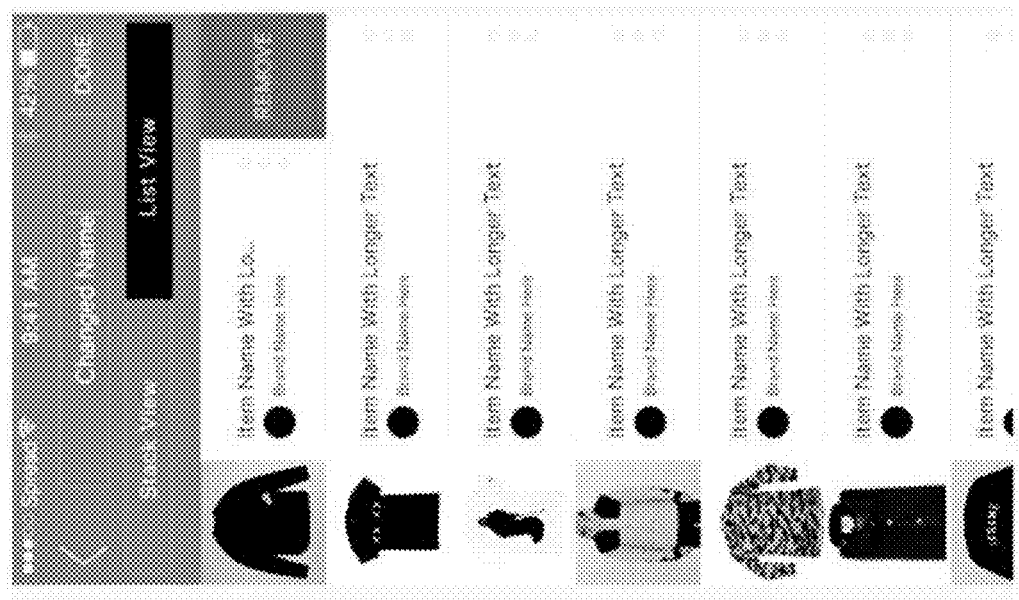
FIG. 10E illustrates an exemplary user environment for editing a stack.

FIG. 10E illustrates an exemplary user environment 648 for editing a stack. Content items selected for inclusion in the stack are displayed in list view. Various information entries such as stack name, item names and brand names. An option to remove one or more items is also provided.

Figure 10F:
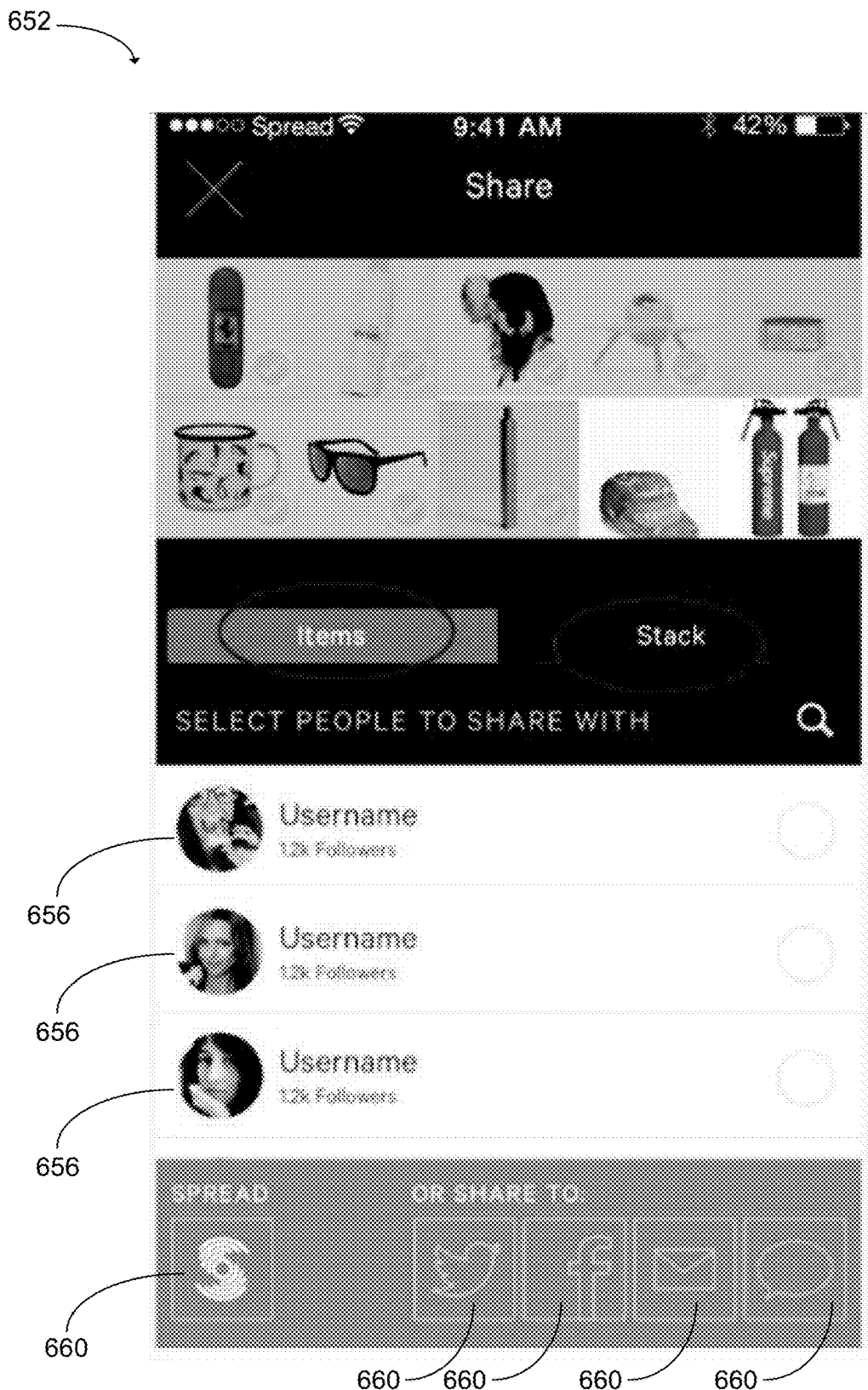
FIG. 10F illustrates an exemplary user environment for sharing a content item or a stack.

FIGS. 10F and 10G illustrates exemplary user environments 652 for sharing a content item or a stack. The environment 652 includes a plurality of other user indicators 656 corresponding to other users that may be selected. Users selected are associated with the content item or stack being shared. The content item or stack is then made available to these other users for receiving feedback from these other users. Various selectable buttons 660 are provided to allow the user to share the content item or stack over different social networking platforms.

According to various exemplary embodiments, multiple users participate within the feedback receiving system to provide feedback for a content item. Accordingly, feedback or judgment may be individually provided by a plurality of the users for the same content items. That is, in addition to a given user providing feedback for a content item, a plurality of other users can also provide feedback for the same content item.

The providing of feedback for the content item by the other users may follow exemplary systems and method described herein. For example, for the other users, the providing of feedback includes displaying the content item on the touch display screens 18 of user devices 16 controlled by a plurality of different other users. Each touch display screen 18 of the user devices 16 being used by other users is operable to detect a user contact with the touch display screen 18. For each touch display screen 18 in the plurality of touch display screens being used by the other users, a first direction and a second direction is also defined such that the user contact by each of the other users with that touch display screen 18 indicates both the first directional value along the first direction and the second directional value along the second direct. Furthermore, for each touch display screen in the plurality of touch display screens the user contact with the touch display screen is detected when that touch display screen is displaying the content item. For each touch display screen in the plurality of touch display screens, the first directional value and the second directional value are determined.

The first directional values and second directional values determined from user contact by each of the other users form judgments or feedback provided by each of the plurality of other users regarding the content item. Each judgment made by one of the plurality of users regarding the content item is specific to the user. Accordingly, the judgement by the user includes a user-specific first directional value and a user-specific second directional value that represent the judgment of that item by that user. As a result of the plurality of other users individually providing judgements regarding the content item, a plurality of judgments are provided.

According to various exemplary embodiments, a plurality of user groups are defined in relation to the content item. Each user group in the plurality of user groups have an associated predefined range for the first directional value and the second directional value. A response to the determination of a first directional value and a second directional value from a user contact may include assigning the user that performed the user contact to a corresponding group in the plurality of user groups based on that first directional value and that second directional value. The assigning may be based on whether the first directional value and the second directional value of that user falls within the pre-defined range for that group. A different response may be initiated for users in different groups.

Referring back to FIG. 3, in addition to the first user data entry 200, data entries for other users may also be stored. As illustrated, the data structure includes a second user data entry 200*b* for a second user. The second user data entry 200*b* includes a treated items entry 220, which stores identifiers 104 of content items that have been associated with the second user and for which the second user has provided feedback. One or more of the content items identified within the treated items entry 220*b* may also have been identified in treated items entry 220 of the first user data entry 200. Overlap of these content items signifies that these content items have received feedback from both the first user and the second user.

A third user data entry 200*c* may also be included and have a treated items entry 220*c*. One or more of the content items identified within the treated items entry 220*c* of the third user data entry 200*c* may also have been identified in the treated items entry 220 of the first user data entry 200 and the treated items entry 220*b* of the second user data entry 220*b*. Overlap of these content items signifies that these content items have received feedback the first user, the second user and the third user.

According to various exemplary embodiments, for a given user that is providing feedback to a content item, indicators of the feedback provided by other users to that same content items may be displayed. For example these indicators may be displayed on touch display screen 18 of a user device 16 being used by the feedback providing user. The displaying of these indicators may overlap in time with the displaying of the content item for which feedback is to be received.

Referring now to FIGS. 11A and 11B, therein illustrated are captures of an exemplary feedback providing environment 400 during an ongoing feedback providing sessions that include indicators of feedback provided by other users. The environment 400 includes a plurality of other user designators 708 that act as indicators of the feedback provided by other users. Each other user designator 708 identifiers another user. Furthermore, each other user designator is displayed on the touch display screen at an associated location based on the user-specific first directional value and the user specific second directional value of the user judgment provided by that user for the display content item. For example, the user-specific first directional value and the user specific second directional value of the user judgment may be retrieved from the recorded data entries for feedback provided by the other user for that content item.

The associated location provides the indication of the feedback provided by that other user for the content item. The associated location is such that a first directional value and a second directional of a user contact made by the current feedback providing user to that location would correspond to the user-specific first directional value and the user-specific second directional value of the user judgment made by the other user. That is, a user contact, such as a swiping motion, to the associated location would result in the feedback provided by the current user having the same first directional value and the second directional value as the user-specific first directional value and the user specific second directional value of the other user judgment.

Referring back to FIG. 11A, some of the of other user designators 708 are located within the touch display screen 18 along the first slider 412 to indicate that each user identified by these user designators 708 entered a user judgment that include a positive reaction to the currently displayed content item. Furthermore, these user designators 708 are located at different locations of the slider 412 between the top end 416 and bottom end 418 to indicate the degrees of the positive reactions entered within the user judgments.

Similarly, other other user designators 708 are located within the touch display screen 18 along the second slider 420 to indicate that each user identified by these other other user designators 708 entered a user judgment that include a negative reaction to the currently displayed content item. Furthermore these other other user designators 708 are located at different locations of the slider between the top end 412 and the bottom end 422 to indicate the degrees of the negative reactions entered within the user judgments.

According to various exemplary embodiments, each other user designator 708 includes a corresponding user identifier displayed in the corresponding other user designator displayed on the touch display screen 18. For example, and as illustrated, the user identifier is a profile picture of the corresponding other user associated with the other user designator. In other examples, the user identifier may be a usernames of the other user.

Referring now to FIG. 11B, therein illustrated is a capture of an exemplary feedback providing environment 400 during an ongoing feedback providing sessions. In the capture of FIG. 10B, the current feedback providing user has begun a user contact. Accordingly, an indicator item 408 is illustrated to represent a current user contact.

The other user designators 708 may designate other users that are associated with the current feedback providing user. For example, the other users may be users that are followed by the current feedback providing user.

According to various exemplary embodiments, at least one additional characteristic may be measured during a feedback providing session and while the content item is displayed on the touch display screen 18. The additional characteristic is communicated to the processor and the response is further determined based on the characteristic in addition to the first directional value, the second directional value and the displayed content item.

The at least one characteristics may include a variable biometric characteristic of the user. The biometric characteristic may be measured by a biometric sensor of the user device 16 or by an external sensor that is in communication with the user device. The variable biometric characteristic may include one or more of blinking, pupil dilation, blood pressure, pulse rate, electrical conductivity of the skin, rapidity of the swiping motion, movement of the user device measured by an accelerometer.

According exemplary embodiments wherein a sequence of images are determined, a sequence of biometric measurements corresponding to the sequence images is determined. The sequence of biometric measurements is determined by, when displaying each image in the sequence of images on the touch display screen, measuring a corresponding variable biometric characteristic of the user. A response is then determined based on each of the variable biometric characteristics of the user.

Figure 12:
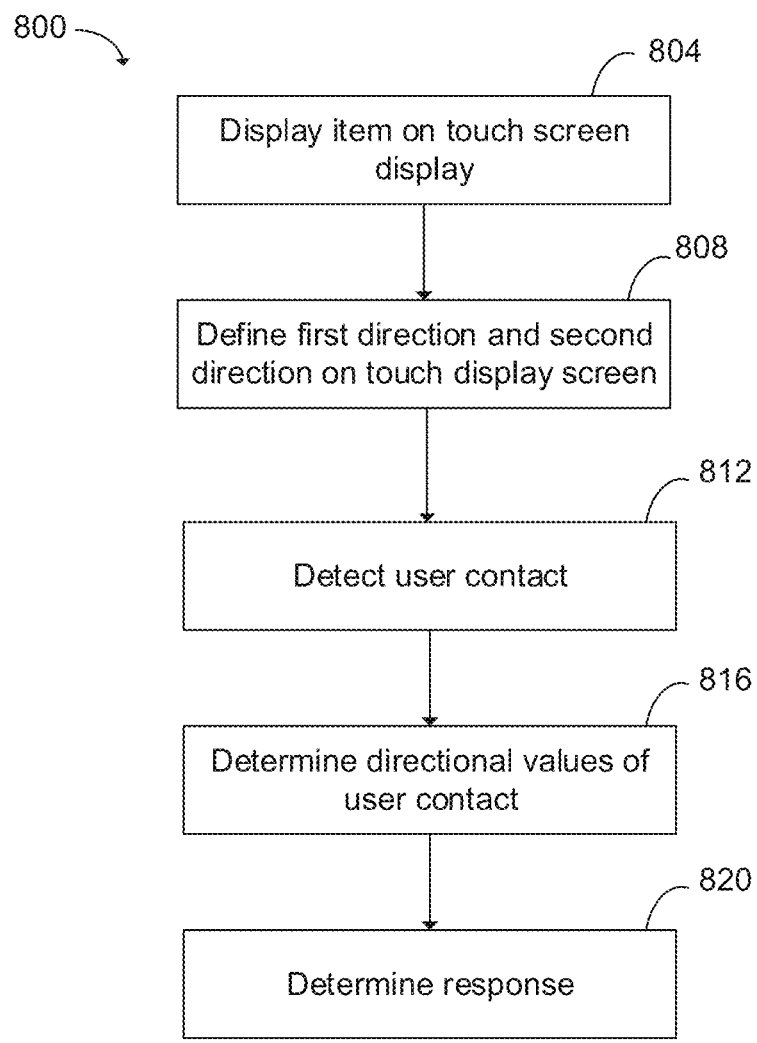
FIG. 12 illustrates a flowchart diagram of a method for receiving feedback from a user according to one exemplary embodiment.

Referring now to FIG. 12, therein illustrated is a flowchart diagram of an exemplary embodiment of a method 800 for receiving of feedback from a user.

At step 804, a content item is displayed on the touch screen display 18 of a user device 16 being viewed by a feedback providing user.

At step 808, a first direction and a second direction of the touch display screen is defined. This step may also occur before step 804, perhaps well before. For example, the first direction and the second direction of the touch display screen may be defined prior to any content items being displayed on the touch display screen 18.

At step 812, a user contact with the touch display screen is detected while the content item is being displayed.

At step 816, a first directional and a second directional value is determined from the detected user contact.

At step 820, a response to the user contact is determined based on the first directional value, the second directional value and/or the displayed content item.

Figure 13:
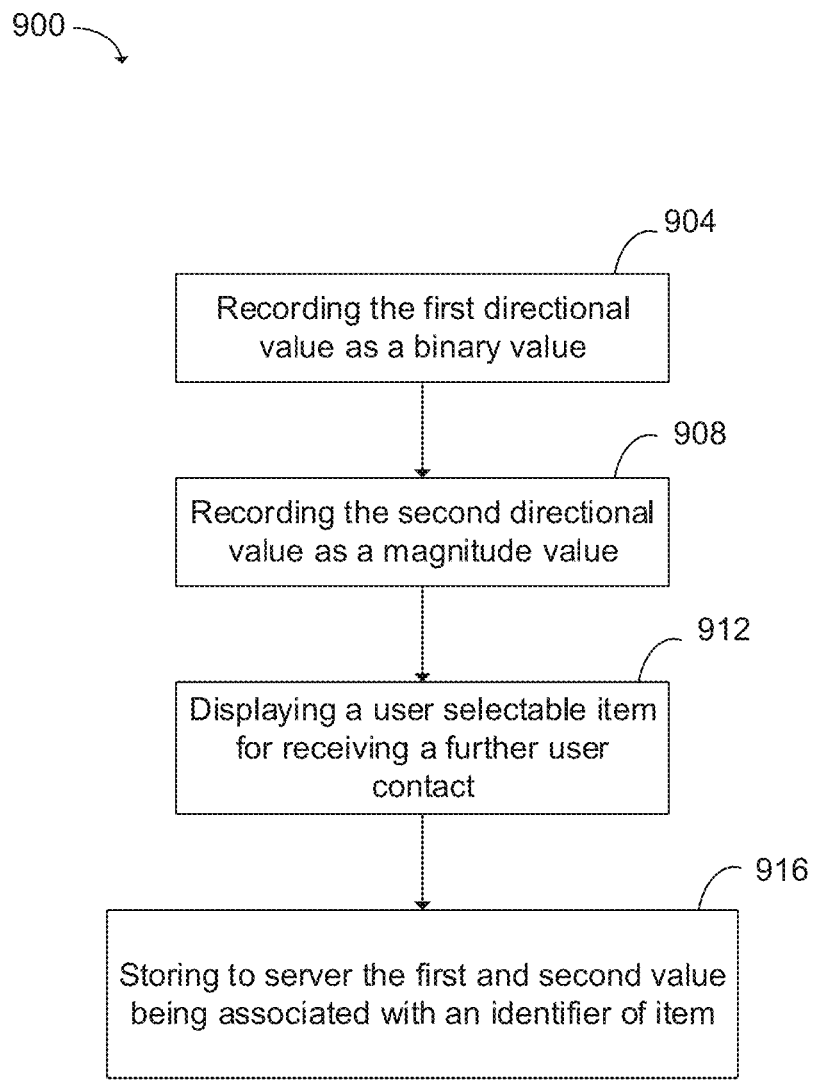
FIG. 13 illustrates a flowchart diagram of a method for determining a response to a user contact according to one exemplary embodiment.

Referring now to FIG. 13, therein illustrated is a flowchart diagram illustrating an exemplary embodiment of a method 900 for determining a response to a user contact. Method 900 may be carried as part of step 820 for determining a response to the user contact.

At step 904, the first directional value determined from the user contact is recorded as binary value.

At step 908, the second directional value determined from the user contact is recorded as a magnitude value.

At step 912, one or more user-selectable items may be optionally displayed to receive a further user contact that selects one or more of the user-selectable items. A user may interact with one or more of the user-selectable items in order to select one or more of the sub-options and include these in the feedback that is provided by the user, as described herein, for example, with reference to FIGS. 8A to 8E. The user-selectable items that are displayed may be determined based on the first directional value and the second directional value.

At step 916, the recorded binary value, the magnitude value and optionally the selected item is transmitted to a server and stored at the served. The binary value and the magnitude and optionally the selected item may be associated with an identifier of the feedback providing user and an identifier of the content item that is displayed.

Figure 14:
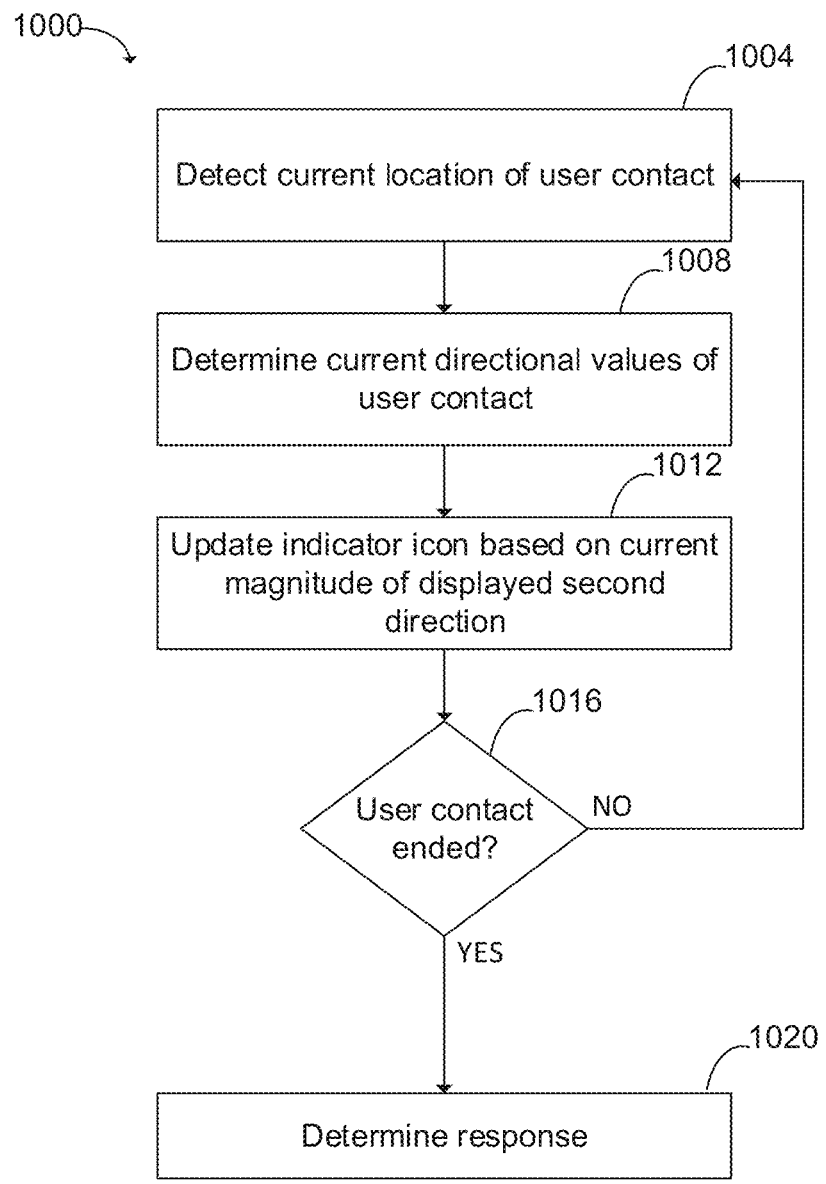
FIG. 14 illustrates a flowchart diagram of a method for displaying and adjusting an indicator item within a feedback providing session according to one exemplary embodiment.

Referring now to FIG. 14, therein illustrated is a flowchart diagram illustrating an exemplary embodiment of a method 1000 for displaying and adjusting an indicator item within a feedback providing session.

At step 1004, the current location of the user contact is determined.

At step 1008, a first directional value and a second directional value is determined from the current location.

At step 1012, an indicator item is displayed on the touch screen display 18 at the same time that the content item is being displayed. At least one visual characteristic of the indicator item is determined based on the current first directional value and the second directional value. Where an indicator item is already being displayed, at least one visual characteristic of the indicator item may be adjusted if there has been a change in the first directional value and/or the second directional value.

At step 1016, it is determined whether the user contact has ended. If the user contact has not ended, the method proceeds to step 1004 to determine if there has been a change in the current location. If the user contact has ended, a response to the user contact is determined at step 1020 based on the first directional value and the second directional value determined from the location of the user contact at the time the contact is ended.

Figure 15:
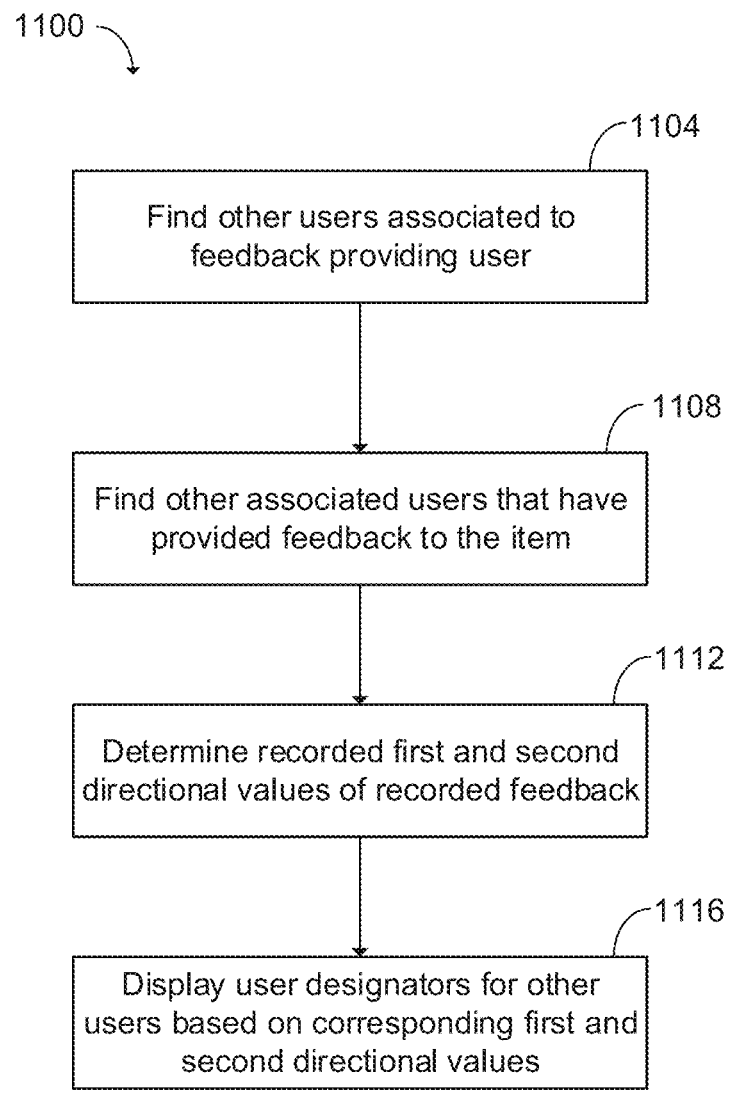
FIG. 15 illustrates a flowchart diagram of a method for displaying other user designators within a feedback providing session according to one exemplary embodiment.

Referring now to FIG. 15, therein illustrated is a flowchart diagram illustrating an exemplary embodiment of a method 1100 for displaying other user designators within a feedback providing session.

At step 1104, other users associated with the feedback providing user is found. For example, these associations may be determined from the followers entry 208 and following entry 212 stored within a user data entry 200 for the feedback providing user in the user database 52.

At step 1108, amongst the associated other users, those other users that have provided feedback to the current content item is found. For example, these users may be found by considering the treated items entry 220 associated with each of the associated other users.

At step 1112, for each judgment made by other users for the current content item, a corresponding first directional value and a corresponding second directional value is determined.

At step 1116, other user designators are displayed on the touch display screen 18 at the same time that the current content item is being displayed. The location of each other user designator may be determined based on the corresponding first directional value and the corresponding second directional value.

Various exemplary embodiments described herein allows a user to more quickly and more easily share his or her judgment of one or more content items in a more detailed way. In particular, feedback provided by the user can have both a binary value (ex: positive or negative reaction) and a magnitude value (ex: degree of the reaction). Furthermore, the two components of the feedback may be provided within a single user contact, such as a single swiping motion performed by the feedback providing user.

Moreover, by appropriately recording the binary values and the magnitude values for a plurality of judgments performed by a plurality of the users, these judgments may be displayed as other user designators within a feedback providing environment. A feedback providing user can then visually review the judgments made by other users. By appropriately locating the other user designators, a feedback providing user can further visually determine the binary value and magnitude value of the judgments made by the other users.

According to various exemplary embodiments, the content items for which feedback is received may be fashion items, such as, but not limited to, tops, bottoms, jackets, shoes, and fashion accessories. However, it will be understood that other types of items may also be provided. The feedback receiving system allows to users to quickly share their judgments and keep up with current trend.

Figure 16:
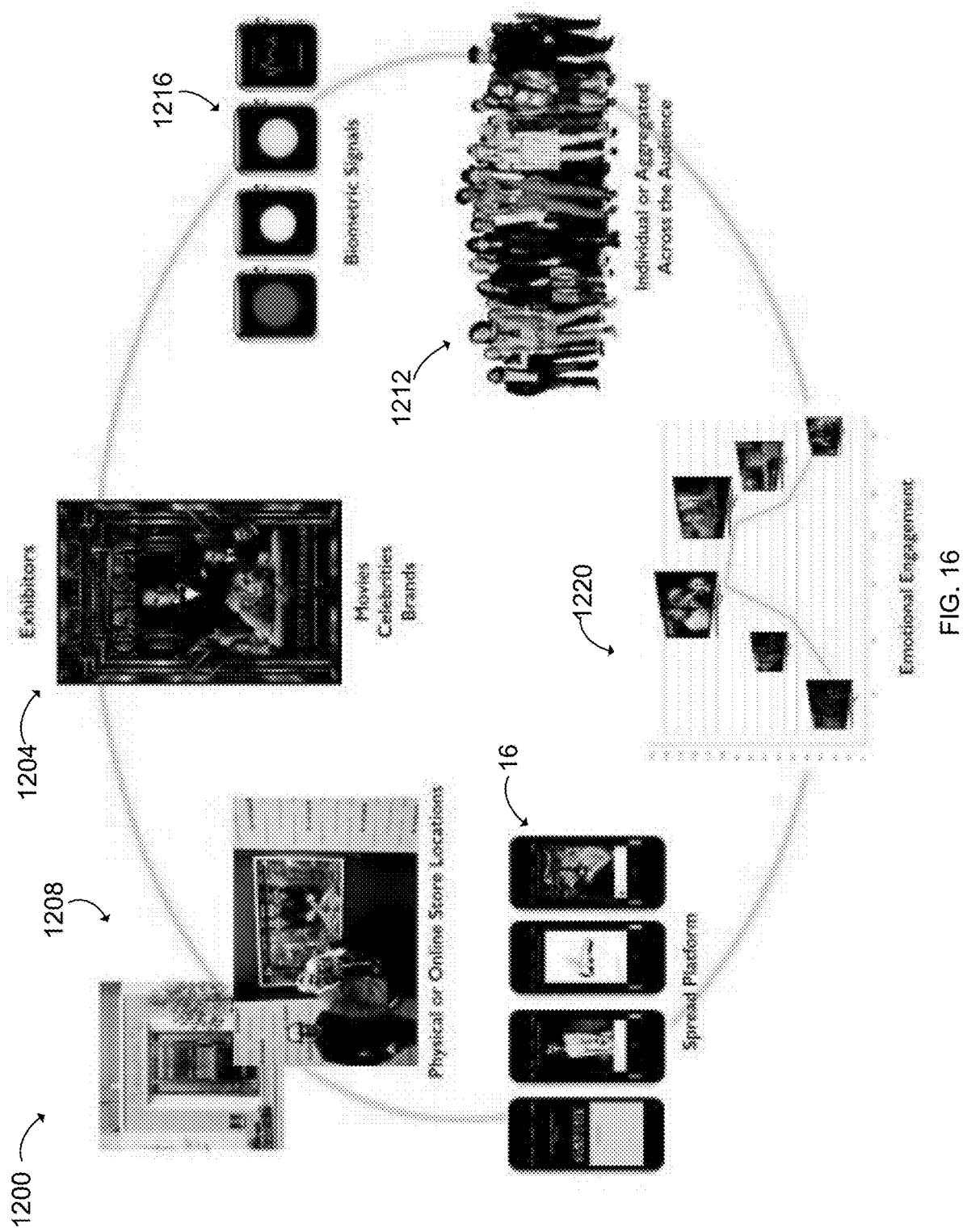
FIG. 16 illustrates a schematic diagram of relationships between participants and devices within an example of a feedback providing and receiving implementation

Referring now to FIG. 16, therein illustrated is a schematic diagram of relationships between participants and devices within an example of a feedback providing and receiving implementation 1200. Some participants may be content-generators. Content-generators, which may be registered to a feedback receiving system as content creating users, provide consumer content that may be consumed by end users. Consumer content may be physical goods, such as cloths or jewelry, or intangible goods, such as images, videos, brands, and celebrities. In the illustrated example, a first content generator 1204 is a movie studio that produces a movie. Consumer content arising from the movie may include the movie itself, brands shown in the movie and actors featured in the movie. Second content generators 1208 include distributors of content, such as physical or online stores, that distribute consumer content related to the movie. For example, the stores may distribute a clothing line or a jewelry line that is related to the movie.

Within a feedback receiving system, consumer content can be represented by electronic content items, such as the movie itself, images from the movie, clips of the movie, images of jewelry or clothing related to the movie, etc. These electronic content items can be shared with feedback providing users 1212 that provide their feedback to the content items by interacting with user devices 16 that display the content items. In some cases, user feedback may also include sensors 1216 that measure characteristics of the user, such as biometric characteristics.

In some exemplary embodiments, feedback provided by the users may be aggregated by information collectors. Metrics 1220 of user feedback may be determined or computer. These may allow feedback providing users 1212 to identify trending and popular items. These may also allow content-generators to gauge the success of their content.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A computer-implemented method of receiving feedback from a user, the method comprising:

displaying an item on a touch display screen, the touch display screen being operable to detect a user contact with the touch display screen;

defining, with respect to the touch display screen, a first direction of the touch display screen and a second direction of the touch display screen such that the user contact with the touch display screen indicates both a first directional value in the first direction, and a second directional value in the second direction; then detecting the user contact with the touch display screen when the touch display screen is displaying of the item;

determining the first directional value and the second directional value of the user contact;

determining a response to the user contact based on the first directional value, the second directional value and the item;

wherein the response i) comprises a reaction value to the item corresponding to the first directional value, ii) a magnitude value of the reaction value to the item corresponding to the second directional value, and iii) varies with each and every variation in the first directional value and with each and every variation in the second directional value; and displaying the item on a second touch display screen, to a second user, with a user designator for indicating the user's feedback regarding the item, the user designator comprising the reaction value, and the magnitude value.

2. The computer implemented method as defined in claim 1 wherein determining the response comprises determining a message based on the first directional value, the second directional value and the item and then sending the message to the user.

3. The computer implemented method as defined in claim 1 wherein determining the response comprises determining a category comprising the at least one item;

recording a binary value for the user vis-à-vis that category in a memory, the binary value being positive, indicating the user likes the item, or negative, indicating the user dislikes the item, and being determined from the first directional value;

when the binary value for the user is positive, recording a magnitude of a positive value, the magnitude being determined from the second directional value;

when the binary value for the user is positive, sending a message to the user wherein the message differs depending on the magnitude of the positive value.

4. The computer-implemented method as defined in claim 1 wherein the touch display screen is substantially planar, and defining, with respect to the touch display screen, the first direction of the touch display screen and the second direction of the touch display screen comprises defining a substantially Cartesian coordinate system wherein the first direction is substantially orthogonal to the second direction, and both the first direction and the second direction are substantially parallel to the touch display screen.

5. The computer-implemented method as defined in claim 1 further comprising receiving a plurality of judgments regarding the item from a plurality of other users, the plurality of judgments comprising, for each user in the plurality of other users, a user judgment regarding the item, wherein the user judgment regarding the item comprises a user-specific first directional value and a user-specific second directional value representing a judgment of that item by that user.

6. The computer-implemented method as defined in claim 5 further comprising displaying, on the touch display screen, a plurality of other user designators wherein the plurality of other user designators comprises, for each user in the plurality of other users, a corresponding other user designator, and each other user designator being displayed, on the touch display screen, at an associated location based on the user-specific first directional value and the user-specific second directional value of the user judgment.

7. The computer-implemented method as defined in claim 6 wherein the displaying, on the touch display screen, the plurality of other user designators overlaps in time with the displaying the item on the touch display screen.

8. The computer-implemented method as defined in claim 6, wherein for each user in the plurality of other users, a corresponding user identifier is displayed in the corresponding other user designator displayed on the touch display screen, such that the other user is identifiable by the user from the corresponding other user designator.

9. The computer-implemented method as defined in claim 1 wherein displaying the item on the touch display screen comprises displaying the item on a plurality of touch display screens controlled by a plurality of different users, each touch display screen being operable to detect a user contact with the touch display screen;

defining, with respect to the touch display screen, the first direction of the touch display screen and the second direction of the touch display screen comprises defining, for each touch display screen in the plurality of touch display screens, the first direction and the second direction such that the user contact with that touch display screen indicates both the first directional value along the first direction, and the second directional value along the second direction;

detecting the user contact with the touch display screen when the touch display screen is displaying of the item comprises determining, for each touch display screen in the plurality of touch display screens the user contact with the touch display screen when that touch display screen is displaying the item; then for each touch display screen in the plurality of touch display screens, determining the first directional value and the second directional value of the user contact;

the method further comprises defining a plurality of user groups in relation to the item, each user group in the plurality of user groups having an associated predefined range for the first directional value and the second directional value, and operating the processor to initiate the response to the user contact comprises, for each user in the plurality of users, assigning that user to a corresponding group in the plurality of user groups based on the first directional value and the second directional value of that user falling within the predefined range for that group, and then initiating a different response for users in different groups.

10. The computer-implemented method as defined in claim 1 wherein the user contact with the touch display screen defines a vector on the touch display screen, the first directional value being a component of the vector along the first direction of the touch display screen, and the second directional value being a component of the vector along the second direction of the touch display screen.

11. The computer implemented method as defined in claim 10 wherein the user contact is a swiping motion wherein the user moves the user contact along the screen to define the vector.

12. The computer-implemented method as defined in claim 1 further comprising,
when displaying the item on the touch display screen, measuring a variable biometric characteristic of the user; and
communicating the variable biometric characteristic of the user to the processor and then determining the response based on the variable biometric characteristic in addition to the first directional value, the second directional value and the item.

13. The computer-implemented method as defined in claim 1 wherein
displaying the item on the touch display screen comprises providing a stack comprising a sequence of items for display on the touch display screen such that each image, when displayed, displays a corresponding item on the touch display screen;
detecting the user contact with the touch display screen comprises detecting a sequence of user contacts corresponding to the sequence of items;
determining the first directional value and the second directional value of the user contact comprises determining a corresponding first directional value and a corresponding second directional value for each user contact in the sequence of user contacts; and,
the method further comprises after detecting at the first directional value and the second directional value of the user contact in relation to the corresponding item for each image in the sequence of items except for a last item in the sequence of items, automatically displaying the next item in the sequence of items.

14. The computer-implemented method as defined in claim 13 wherein operating the processor to initiate the response to the user contact comprises operating the processor to initiate a corresponding response for each user contact in the plurality of user contacts.

15. The computer-implemented method as defined in claim 14 further comprising,
determining a sequence of biometric measurements corresponding to the sequence of items by, when displaying each item in the sequence of items on the touch display screen, measuring a corresponding variable biometric characteristic of the user; and
for each corresponding variable biometric characteristic of the user, communicating the variable biometric characteristic of the user to the processor and then determining the response based on the variable biometric characteristic in addition to the first directional value, the second directional value and the item.

16. The computer-implemented method as defined claim 1 wherein determining the response comprises determining a data entry for the displayed item based on the first directional value, the second directional value and the item; and wherein the method further comprises storing the data entry, the stored data entry being associated with an identifier data entry for the user and indicating an identifier of the displayed item, the first directional value and the second directional value.

17. The computer-implemented method as defined claim 2 wherein determining the message comprises determining a set of sub-options based on the first directional value and the second directional value; and wherein sending the message to the user comprises displaying on the touch display screen a set of user-selectable items, each user-selectable item corresponding to a unique one of the set of sub-options; and
wherein the method further comprises detecting at least one further user contact with the touch display screen corresponding to selecting at least one of the user-selectable items.

18. The computer-implemented method as defined claim 1 wherein the touch display screen comprises a first pair of opposing sides and a second pair of opposing sides being substantially orthogonal to the first pair of opposing sides;
wherein determining the first directional value is a positive binary value when the user contact is detected inside a region defined within a predetermined distance of one of the first pair of opposing sides;
wherein determining the first directional value is a negative binary value when the user contact is detected inside a region defined within a predetermined distance of the other of the first pair of opposing sides; and
wherein determining the second directional value as a magnitude value based on a distance of the user contact from a given one of the second pair of opposing sides.

19. The computer implemented method as defined claim 18 wherein the first pair of opposing sides are opposing long sides of the touch display screen and the second pair of opposing sides are opposing short sides of the touch display screen.

20. The computer-implemented method as defined claim 1 wherein the user contact comprises a continuous contact of the user with the touch display screen,
wherein the first directional value and the second directional value of the user contact are determined from a current location of the contact with the touch display screen;
wherein determining a response comprises determining a feedback indicator representing the current location; and
the method further comprises providing the feedback indicator via a user device of the touch display screen.

21. The computer-implemented method as defined claim 20, wherein the feedback indicator is a visual indicator displayed on the touch display screen, the method further comprising:
adjusting a first visual characteristic of the displayed visual indicator based on a change in the first directional value; and
adjusting a second visual characteristics of the displayed visual indicator based on a change in the second directional value.

22. A system for receiving feedback from a user, the system comprising:
a memory for storing a plurality of instructions;
a processor coupled to the memory, the processor configured for:
displaying an item on a touch display screen, the touch display screen being operable to detect a user contact with the touch display screen;
defining, with respect to the touch display screen, a first direction of the touch display screen and a second direction of the touch display screen such that the user contact with the touch display screen indicates both a first directional value in the first direction, and a second directional value in the second direction; then
detecting the user contact with the touch display screen when the touch display screen is displaying of the item;

determining the first directional value and the second directional value of the user contact;

determining a response to the user contact based on the first directional value, the second directional value and the item;

wherein the response i) comprises a reaction value to the item corresponding to the first directional value, ii) a magnitude value of the reaction value to the item corresponding to the second directional value, and iii) varies with each and every variation in the first directional value and with each and every variation in the second directional value; and displaying the item on a second touch display screen, to a second user, with a user designator for indicating the user's feedback regarding the item, the user designator comprising the reaction value, and the magnitude value.

23. A non-transitory tangible computer-readable medium including computer executable instructions, which, when executed on a computing device using a processor of the computing device, cause the computing device to carry out the steps of:

displaying an item on a touch display screen of the computing device, the touch display screen being operable to detect a user contact with the touch display screen;

defining, with respect to the touch display screen, a first direction of the touch display screen and a second direction of the touch display screen such that the user contact with the touch display screen indicates both a first directional value in the first direction, and a second directional value in the second direction; then detecting the user contact with the touch display screen when the touch display screen is displaying of the item;

determining the first directional value and the second directional value of the user contact;

determining a response to the user contact based on the first directional value, the second directional value and the item;

wherein the response i) comprises a reaction value to the item corresponding to the first directional value, ii) a magnitude value of the reaction value to the item corresponding to the second directional value, and iii) varies with each and every variation in the first directional value and with each and every variation in the second directional value; and displaying the item on a second touch display screen, to a second user, with a user designator for indicating the user's feedback regarding the item, the user designator comprising the reaction value, and the magnitude value.

* * * * *